US011580599B1

(12) United States Patent
Kerof et al.

(10) Patent No.: US 11,580,599 B1
(45) Date of Patent: *Feb. 14, 2023

(54) INTELLIGENT LOAN OFFERING AT A POINT OF SALE

(71) Applicant: BLOCK, INC., San Francisco, CA (US)

(72) Inventors: Varun Kerof, Burlingame, CA (US); Elliot Block, New York, NY (US); Kelvin Chou, Monte Sereno, CA (US); Theodore Kosev, Seattle, WA (US)

(73) Assignee: BLOCK, INC., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/704,153

(22) Filed: Mar. 25, 2022

Related U.S. Application Data

(63) Continuation of application No. 17/460,413, filed on Aug. 30, 2021, which is a continuation of application No. 15/994,882, filed on May 31, 2018, now Pat. No. 11,107,157.

(51) Int. Cl.
  *G06Q 40/02* (2012.01)
  *G06Q 20/20* (2012.01)

(52) U.S. Cl.
  CPC ......... *G06Q 40/025* (2013.01); *G06Q 20/206* (2013.01)

(58) Field of Classification Search
  None
  See application file for complete search history.

(56) References Cited

U.S. PATENT DOCUMENTS

| 6,941,281 | B1 | 9/2005 | Johnson |
| 7,630,932 | B2 | 12/2009 | Danaher et al. |
| 8,204,779 | B1 | 6/2012 | Hughes et al. |
| 9,727,912 | B1 | 8/2017 | Poursartip et al. |
| 9,892,458 | B1 * | 2/2018 | Shearer ................ G06Q 20/202 |
| 10,007,953 | B1 | 6/2018 | Nathoo et al. |
| 10,019,698 | B1 | 7/2018 | Scott et al. |

(Continued)

FOREIGN PATENT DOCUMENTS

WO 2008/150243 A2 12/2008

OTHER PUBLICATIONS

"Report Information from Dialog", Dialog (Jul. 3, 2021), pp. 1-30.

(Continued)

*Primary Examiner* — Fateh M Obaid
(74) *Attorney, Agent, or Firm* — Mattingly & Malur, PC

(57) ABSTRACT

In some examples, a computing device receives, from a point of sale (POS) device of a merchant, an authorization request for authorizing a payment instrument for a transaction for an item. The computing device sends an authorization approval to the POS device, and determines that a user is eligible for a loan for an amount and the loan is to be repaid at a particular frequency during a period of time. The computing device determines that an amount of the transaction is less than or equal to the amount, and causes an offer for the loan to be presented via a user interface of a payment application that is executable by a user device of the user. Based on acceptance of the loan, the computing device applies the loan funds to the transaction for the item, and the loan is repaid at the particular frequency.

20 Claims, 8 Drawing Sheets

(56) References Cited

U.S. PATENT DOCUMENTS

| | | |
|---|---|---|
| 10,445,716 B1 | 10/2019 | Riechers et al. |
| 10,453,086 B1 | 10/2019 | Scott et al. |
| 10,535,054 B1 | 1/2020 | Sptizer et al. |
| 10,628,816 B1 | 4/2020 | Scott et al. |
| 10,692,140 B1 | 6/2020 | Kim et al. |
| 11,107,157 B1 | 8/2021 | Kerof et al. |
| 11,176,607 B1 | 11/2021 | Bekmann et al. |
| 11,379,913 B1 | 7/2022 | Perelli-Minetti et al. |
| 2001/0044756 A1 | 11/2001 | Watkins et al. |
| 2003/0074311 A1 | 4/2003 | Saylors et al. |
| 2003/0163447 A1 | 8/2003 | Sandman |
| 2004/0111361 A1 | 6/2004 | Griffiths et al. |
| 2004/0225545 A1 | 11/2004 | Turner et al. |
| 2004/0225594 A1 | 11/2004 | Nolan, III et al. |
| 2005/0131843 A1 | 6/2005 | Sansone et al. |
| 2006/0015469 A1 | 1/2006 | Whitehouse |
| 2006/0161435 A1* | 7/2006 | Atef ............... G06Q 20/4015 704/246 |
| 2006/0173772 A1* | 8/2006 | Hayes ............... G06Q 40/02 705/37 |
| 2006/0242030 A1 | 10/2006 | Blanchard et al. |
| 2007/0150387 A1 | 6/2007 | Seubert et al. |
| 2007/0271178 A1 | 11/2007 | Davis et al. |
| 2007/0288357 A1 | 12/2007 | Holman et al. |
| 2008/0243569 A1 | 10/2008 | Hadden |
| 2009/0112658 A1* | 4/2009 | Mullen ............... G06Q 20/10 705/35 |
| 2009/0112659 A1* | 4/2009 | Mullen ............... G06Q 20/405 705/35 |
| 2009/0112660 A1* | 4/2009 | Mullen ............... G06Q 30/04 705/35 |
| 2009/0112661 A1* | 4/2009 | Mullen ............... G06Q 20/04 705/35 |
| 2009/0112662 A1* | 4/2009 | Mullen ............... G06Q 40/02 705/1.1 |
| 2010/0100464 A1 | 4/2010 | Ellis et al. |
| 2011/0178902 A1 | 7/2011 | Imrey et al. |
| 2012/0109820 A1 | 5/2012 | Galit et al. |
| 2012/0233090 A1 | 9/2012 | Tavares et al. |
| 2013/0339219 A1 | 12/2013 | Bernheimer et al. |
| 2014/0229397 A1 | 8/2014 | Fink |
| 2014/0258088 A1 | 9/2014 | Belarj |
| 2014/0351116 A1 | 11/2014 | Hoff |
| 2014/0358766 A1* | 12/2014 | Nayyar ............... G06Q 40/025 705/38 |
| 2015/0026035 A1 | 1/2015 | Showalter |
| 2015/0039490 A1 | 2/2015 | Forrester et al. |
| 2015/0095210 A1* | 4/2015 | Grech ............... G06Q 40/025 705/38 |
| 2015/0100475 A1 | 4/2015 | Cummings et al. |
| 2015/0106260 A1* | 4/2015 | Andrews ............... G06Q 20/4016 705/39 |
| 2015/0149333 A1* | 5/2015 | Yaplee ............... G06Q 40/12 705/30 |
| 2015/0371335 A1 | 12/2015 | Liptak et al. |
| 2017/0098216 A1 | 4/2017 | Studnitzer |
| 2018/0053253 A1 | 2/2018 | Gokhale et al. |
| 2018/0225648 A1 | 8/2018 | Robinson et al. |
| 2019/0172155 A1 | 6/2019 | Byron et al. |
| 2020/0357051 A1* | 11/2020 | Hunt ............... G06Q 20/20 |
| 2020/0357052 A1* | 11/2020 | Hunt ............... G06N 20/00 |
| 2020/0387923 A1 | 12/2020 | Mitchell |

OTHER PUBLICATIONS

Non-Final Office Action dated Apr. 4, 2018, for U.S. Appl. No. 15/855,802, of Jew, W., et al., filed Dec. 27, 2017.
Final Office Action dated Nov. 19, 2018, for U.S. Appl. No. 15/855,802, of Jew et al., filed Dec. 27, 2017.
Advisory Action dated Feb. 8, 2019, for U.S. Appl. No. 15/855,802, of Jew, W., et al., filed Dec. 27, 2017.
Non-Final Office Action dated Oct. 2, 2019, for U.S. Appl. No. 15/855,802, of Jew, W., et al., filed Dec. 27, 2017.
Non-Final Office Action dated Aug. 20, 2020, for U.S. Appl. No. 16/022,397, of Bekmann, J., et al., filed Jun. 28, 2018.
Final Office Action dated Mar. 6, 2020, for U.S. Appl. No. 15/855,802, of Jew, W., et al., filed Dec. 27, 2017.
Non-Final Office Action dated May 15, 2020, U.S. Appl. No. 15/995,039, of Perelli-Minetti, L., et al., filed May 31, 2018.
Advisory Action dated May 21, 2020, for U.S. Appl. No. 15/855,802, of Jew, W., et al., filed Dec. 27, 2017.
Non-Final Office Action dated Jun. 25, 2020, U.S. Appl. No. 15/994,882, of Kerof, V., et al., filed May 31, 2018.
Non-Final Office Action dated Oct. 7, 2020, for U.S. Appl. No. 15/855,802, of Jew, W., et al., filed Dec. 27, 2017.
Final Office Action dated Nov. 13, 2020, U.S. Appl. No. 15/995,039, of Perelli-Minetti, L., et al., filed May 31, 2018.
Final Office Action dated Jan. 6, 2021, U.S. Appl. No. 15/994,882, of Kerof, V., et al., filed May 31, 2018.
Advisory Action dated Feb. 18, 2021, U.S. Appl. No. 15/995,039, of Perelli-Minetti, L., et al., filed May 31, 2018.
Final Office Action dated Mar. 26, 2021, for U.S. Appl. No. 16/022,397, of Bekmann, J., et al., filed Jun. 28, 2018.
Notice of Allowance dated Apr. 15, 2021, U.S. Appl. No. 15/994,882, of Kerof, V., et al., filed May 31, 2018.
Final Office Action dated Apr. 19, 2021, for U.S. Appl. No. 15/855,802, of Jew, W., et al., filed Dec. 27, 2017.
Advisory Action dated May 25, 2021, for U.S. Appl. No. 16/022,397, of Bekmann, J., et al., filed Jun. 28, 2018.
Non-Final Office Action dated Aug. 12, 2021, U.S. Appl. No. 15/995,039, of Perelli-Minetti, L., et al., filed May 31, 2018.
Notice of Allowance dated Jul. 13, 2021, for U.S. Appl. No. 16/022,397, of Bekmann, J., et al., filed Jun. 28, 2018.
Advisory Action dated Sep. 15, 2021, for U.S. Appl. No. 15/855,802, of Jew, W., et al., filed Dec. 27, 2017.
Notice of Allowance dated Oct. 4, 2021, for U.S. Appl. No. 15/855,802, of Jew, W., et al., filed Dec. 27, 2017.
Notice of Allowance dated Sep. 9, 2021, for U.S. Appl. No. 16/022,397, of Bekmann, J., et al., hied Jun. 28, 2018.
Supplemental Notice of Allowability dated Oct. 15, 2021, for U.S. Appl. No. 16/022,397, of Bekmann, J., et al., filed Jun. 28, 2018.
Supplemental Notice of Allowability dated Oct. 15, 2021, for U.S. Appl. No. 15/855,802, of Jew, W., et al., filed Dec. 27, 2017.
Supplemental Notice of Allowability dated Oct. 25, 2021, for U.S. Appl. No. 15/855,802, of Jew, W., et al., filed Dec. 27, 2017.
Notice of Allowance dated Feb. 23, 2022, U.S. Appl. No. 15/995,039, of Perelli-Minetti, L., et al., filed May 31, 2018.

* cited by examiner

US 11,580,599 B1

INTELLIGENT LOAN OFFERING AT A POINT OF SALE

CROSS-REFERENCE TO RELATED APPLICATION

This application is a continuation of, and claims priority to, U.S. patent application Ser. No. 17/460,413, filed Aug. 30, 2021, which is a continuation of, and claims priority to, U.S. patent application Ser. No. 15/994,882, filed May 31, 2018, issued as U.S. Pat. No. 11,107,157, and all of which are incorporated by reference herein.

BACKGROUND

When making purchases, merchants are often forced to decide how much to buy based on a current cash balance. This can cause merchants stress and can impact their businesses. For instance, due to a low cash balance, a merchant may not be able to purchase items for offering a robust selection of items and thus, can lose sales due to the limited selection of items. Or, due to a low cash balance, a merchant can have to frequently place small orders, which can be inconvenient and can increase the risk that an item sells out before more items can be ordered.

Capital loan products can reduce merchant concerns as noted above. A capital loan product is a product that facilitates the offering and/or lending of a loan to a borrower that is to be used for, in some instances, financing the borrower's short-term operational needs. For instance, a potential borrower that is a merchant can obtain a capital loan via a capital loan product in order to finance various operational costs (e.g., rent, payroll, inventory, etc.).

BRIEF DESCRIPTION OF THE DRAWINGS

The above and other features of the present disclosure, its nature and various advantages, will be more apparent upon consideration of the following detailed description, taken in conjunction with the accompanying drawings in which.

Figure 1:
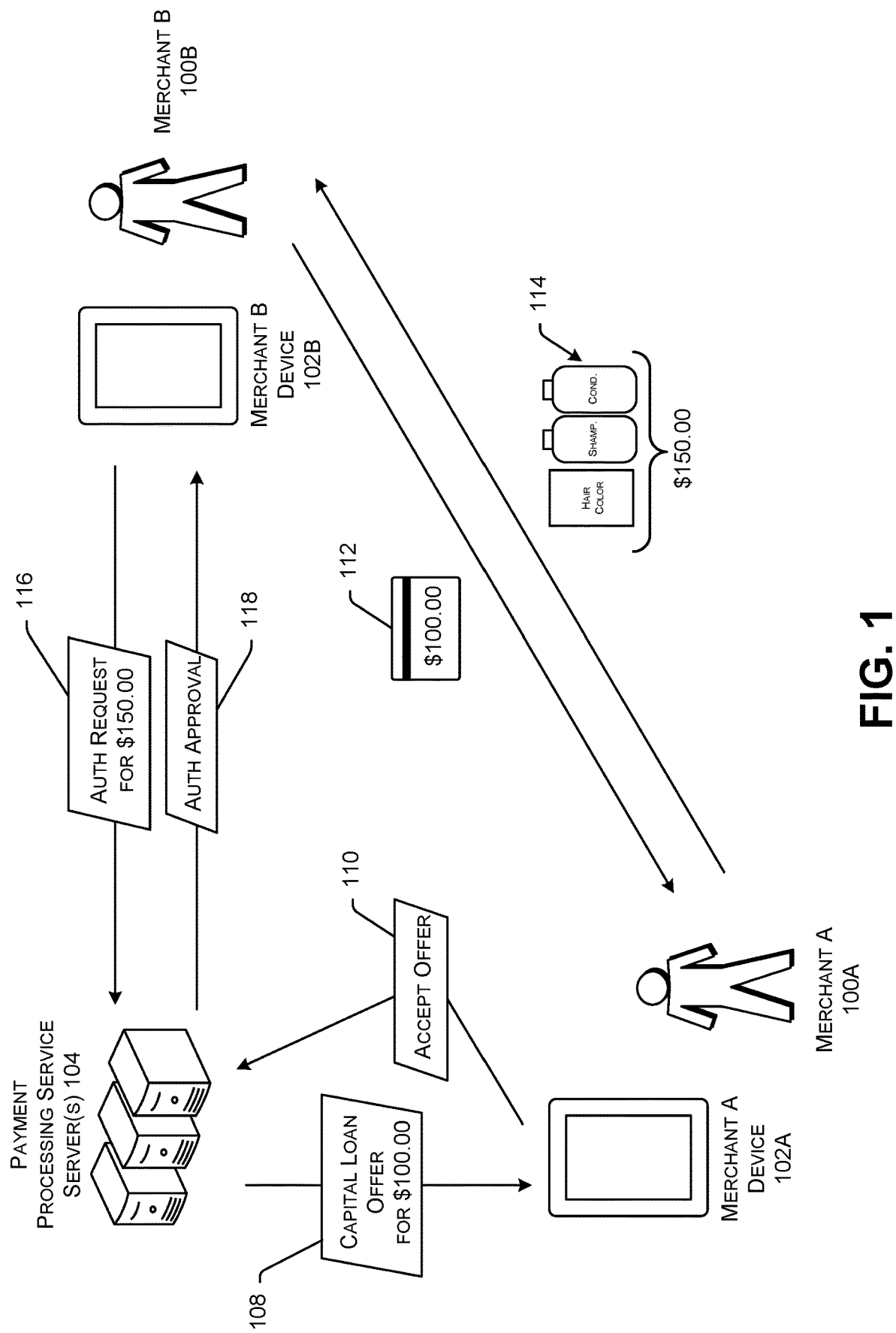
FIG. 1 depicts an illustrative block diagram illustrating an environment for intelligently modifying capital loan offerings at a point-of-sale as described herein.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

Techniques described herein are directed to intelligently modifying capital loan offerings at a point-of-sale (POS). A payment processing service can offer capital loan products and/or services for facilitating the offering and/or lending of a loan to a borrower that is to be used for, in some instances, financing the borrower's short-term operational needs. For instance, a potential borrower that is a merchant can obtain a capital loan via a capital loan product in order to finance various operational costs (e.g., rent, payroll, inventory, etc.).

In at least one example, the payment processing service can select merchants for receiving capital loan offers. Based on determining that a merchant is eligible for a capital loan, the payment processing service can send an offer for a capital loan to the merchant. Responsive to the merchant accepting the offer, the payment processing service can originate a capital loan for the merchant and can provide a payment instrument that is associated with the capital loan amount to a merchant. The merchant can then use the payment instrument for purchasing item(s) from merchant(s) of the merchant's choice, for example. In some examples, the merchant can desire to purchase item(s) from another merchant for an amount that is greater than the approved and/or accepted capital loan amount. Techniques described herein are directed to intelligently increasing the amount of the capital loan (e.g., the limit of the payment instrument) at the POS based on information known about the merchant (e.g., inventory and/or catalog levels, appointment schedule, etc.) and/or the transaction for the item(s) to enable the merchant to purchase the item(s) even though the item(s) cost more than the approved and/or accepted capital loan amount. That is, techniques described herein are directed to the intelligent approval (or denial) of a purchase at the POS of a merchant (a seller) based on the determination of the item(s) to be purchased by a merchant (a buyer) and a nexus between the merchants.

A payment processing service can offer a variety of products and/or services to help merchants manage their businesses. In at least one example, a payment processing service can offer POS systems that are associated with various applications that ease POS interactions with customers. A POS system can include a POS terminal and a payment reader. The payment reader can physically interact with payment instruments such as magnetic stripe payment cards, EMV payment cards, and short-range communication (e.g., near field communication (NFC), radio frequency identification (RFID), Bluetooth®, Bluetooth® low energy, etc.) payment instruments. The POS terminal can provide a rich user interface, communicate with the payment reader, and also communicate with a server associated with the payment processing service. In this manner, the POS terminal and payment reader can collectively process transaction(s) between a merchant and customer(s). The POS terminal can send transaction data associated with the transaction(s) to the payment processing service (i.e., a server associated with the payment processing service) for payment processing.

In some examples, the payment processing service can additionally or alternatively provide other products and/or services to enable merchants to manage other aspects of their businesses. As examples, the payment processing service can provide products and/or services for maintaining a catalog and/or an inventory. Further, in some examples, the payment processing service can provide products and/or services for managing appointments. Additional or alternative products and/or services can include employee management products and/or services, payroll products and/or services, etc.

In at least one example, the payment processing service can offer capital loan products and/or services, as described above. In at least one example, the payment processing service can select merchants for receiving capital loan offers. For instance, the payment processing service can leverage data associated with merchants that subscribe to products and/or services offered by the payment processing service to determine which merchants are eligible for capital loans. In some examples, the payment processing service (i.e., via server(s) associated with the payment processing service) can analyze data associated with the merchants, which can include merchant data (e.g., identifiers of merchants, merchant category code (MCC), item(s) offered for sale by merchants, hardware (e.g., device type) used by the merchants, previous loans made to the merchants, previous defaults on said loans, indications of risk (e.g., based at least in part on fraud, chargeback, etc.) associated with the merchants, etc.), transaction data (e.g., data associated with transaction(s) processed on behalf of the merchants), inventory data (e.g., data associated with inventories of the merchants), catalog data (e.g., data associated with catalogs of the merchants), appointments data (e.g., data associated with appointments of the merchants), employee data (e.g., data associated with employees of the merchants), payroll data (e.g., data associated with payroll of the merchants), etc., to determine whether merchants are eligible for capital loans. Based on determining that a merchant is eligible for a capital loan, the payment processing service can send (i.e., via server(s) associated with the payment processing service) an offer for a capital loan to a device operated by the merchant. Responsive to the merchant accepting the offer, the payment processing service can originate a capital loan for the merchant.

In at least one example, the payment processing service can provide a payment instrument that is associated with an approved and/or accepted capital loan amount to a merchant. That is, the payment processing service can associate an amount of a capital loan with a payment instrument and the payment instrument can be provided to the merchant. In an example, a limit associated with the payment instrument can correspond to the approved and/or accepted capital loan amount. In some examples, the limit can be based on the approved and/or accepted capital loan amount. The merchant can then use the payment instrument for purchasing item(s) from merchant(s) of the merchant's choice, for example. In some examples, the payment instrument can be a physical card that is mailed to the merchant. In other examples, the payment instrument can be a virtual card that is accessible via an application executable on a device of the merchant, an account credit, or another electronic form of payment. In at least one example, the merchant can repay the capital loan (with or without interest) over a period of time.

In some examples, the merchant can desire to purchase item(s) from another merchant for an amount that is greater than the approved and/or accepted capital loan amount (e.g., associated with the payment instrument). For instance, a merchant can be patronizing another merchant and can desire to purchase item(s) that cost more than the limit of the payment instrument associated with the capital loan. Techniques described herein are directed to intelligently increasing the amount of the capital loan (e.g., the limit of the payment instrument) at the POS based on information known about the merchant (e.g., inventory and/or catalog levels, appointment schedule, etc.) and/or the transaction for the item(s) to enable the merchant to purchase the item(s) even though the item(s) cost more than the approved and/or accepted capital loan amount. That is, in at least one example, the payment processing service (i.e., via server(s) associated with the payment processing service) can increase the amount of the capital loan from the approved and/or accepted capital loan amount to a new amount that enables the merchant to purchase the item(s). In at least one example, the determination to increase the amount of the capital loan can depend on information known about both merchants (e.g., merchant classification, inventory and/or catalog levels, appointment schedules, etc.) and/or the current transaction for the item(s). For instance, in at least one example, the payment processing service can determine to increase the amount of the capital loan based on determining that the present transaction is likely to be associated with a business purpose of the merchant. In such an example and using machine learning, the payment processing service can determine that the transaction is for item(s) that are not related to the business of the purchasing merchant, the payment processing service may refrain from modifying the capital loan. Additional or alternative signals such as risk modeling on the ability of the merchant to repay the additional loan amount can be used for determining whether to increase an amount of a capital loan. That is, techniques described herein are directed to the intelligent approval (or denial) of a purchase at the POS of a merchant (a seller) based on the determination of the item(s) to be purchased by a merchant (a buyer) and a nexus between the merchants.

Existing techniques for facilitating capital loans cannot intelligently modify amounts of capital loans at the POS. That is, techniques described herein are both unconventional and non-generic because the payment processing service has access to information about the merchant and a particular transaction such that the payment processing service (i.e., via server(s) associated with the payment processing service) can intelligently modify an amount of a capital loan at a POS of the transaction. Without the ability to access information about the merchant(s) and the particular transaction in near real-time, capital loan servicers cannot make such real-time decisions to increase (or not) an amount of a capital loan offer at the POS.

In addition to offering unconventional and non-generic techniques for generating and managing capital loan offerings, such techniques offer various computational benefits, as well. For instance, by enabling a system to intelligently increase an amount of a capital loan offer at the POS, techniques described herein can avoid sending an authorization denial back to the POS and eliminate the need to send subsequent authorization requests for satisfying a remaining cost of a transaction (e.g., the amount that exceeds the approved and/or accepted capital loan amount). Alleviating the number of authorization denials and subsequent authorization requests exchanged between payment servers and merchant devices can reduce network congestion, increase bandwidth, and conserve compute power. As such, techniques described herein can provide various computational benefits.

FIG. 1 depicts an illustrative block diagram illustrating an environment for intelligently modifying capital loan offerings at a point-of-sale. As illustrated in FIG. 1, two merchants 100 (e.g., Merchant A 100A and Merchant B 100B) interact with a payment processing service via corresponding merchant devices 102 (e.g., Merchant A device 102A and Merchant B device 102B). For the purpose of this discussion, a merchant can be an entity that offers item(s) (e.g., good(s) and/or service(s)) for acquisition (e.g., purchase, trade, rent, borrow, etc.). In some examples, a merchant can also be a customer, buying item(s) from other merchant(s), for instance in a business-to-business transaction. The merchant devices 102 can communicate with payment processing service server(s) 104 via one or more networks (e.g., Wi-Fi, the Internet, etc.). In some examples, both the Merchant A 100A and the Merchant B 100B are subscribers to services of the payment processing service. In other examples, Merchant B 100B may not be a subscriber to services of the payment processing service.

As described above, in at least one example, the payment processing service server(s) 104 can select merchants 100 for receiving capital loan offers. For instance, the payment processing service server(s) 104 can leverage data associated with Merchant A 100A to determine whether Merchant A 100A is eligible for a capital loan. In some examples, the payment processing service server(s) 104 can analyze data associated with the Merchant A 100A, which can include merchant data (e.g., an identifier of the Merchant A 100A, MCC, item(s) offered for sale by the Merchant A 100A, hardware (e.g., device type) used by the Merchant A 100A, previous loans made to the Merchant A 100A, previous defaults on said loans, indications of risk (e.g., based at least in part on fraud, chargeback, etc.) associated with the Merchant A 100A, etc.), transaction data (e.g., encrypted payment data, user authentication data, purchase amount information, point-of-purchase information, etc. associated with one or more transactions processed for the Merchant A 100A), inventory data (e.g., data associated with an inventory of the Merchant A 100A), catalog data (e.g., data associated with a catalog of the Merchant A 100A), appointments data (e.g., data associated with appointments of the Merchant A 100A), employee data (e.g., data associated with employees of the Merchant A 100A), payroll data (e.g., data associated with payroll of the Merchant A 100A), etc., to determine whether the Merchant A 100A is eligible for a capital loan. In at least one example, the payment processing service server(s) 104 can utilize one or more risk analysis techniques to determine whether the Merchant A 100A is eligible for a capital loan, an amount of the capital loan (e.g., a range, a discrete amount, etc.), terms for the capital loan (e.g., interest to be collected, repayment term, repayment amounts, etc.), etc.

Based on determining that the Merchant A 100A is eligible for a capital loan, the payment processing service server(s) 104 can send an offer 108 for a capital loan to the Merchant A device 102A. The offer 108 can include an indication that the Merchant A 100A is eligible for a capital loan, an amount of the capital loan, terms for the capital loan, etc. In some examples, the offer 108 can be associated with a text message, an email, a push notification, etc. In additional or alternative examples, the offer 108 can be presented via a user interface for presenting capital loan offers. For instance, in at least one example, the Merchant A device 102A can present the offer 108 in association with a dashboard. In at least one example, the offer 108 can be associated with a selectable control that can be added to the dashboard, the actuation of which sends an indication 110 to the payment processing service server(s) 104 that the Merchant A 100A accepts the offer. Additionally or alternatively, a selectable control can be associated with a text message, an email, a push notification, etc., and the actuation of the selectable control can send an indication 110 to the payment processing service server(s) 104 indicating that the Merchant A 100A accepts the offer.

For the purpose of this discussion, the original capital loan offer made to the Merchant A 100A is for 100.00. In some examples, the payment processing service server(s) 104 can determine a discrete amount for the capital loan offer and the Merchant A 100A can accept (or not accept) the discrete amount. In other examples, the payment processing service server(s) 104 can determine a range of amounts for the capital loan offer (e.g., a minimum and a maximum amount of funds that the payment processing service is willing to make available to the Merchant A 100A) and the Merchant A 100A can select an amount that is within that range. As described above, the amount of the capital loan can be determined by a risk analysis and/or selected by the merchant receiving the capital loan offer. As such, the amount of the capital loan $100.00 should not be construed as limiting.

Responsive to the merchant accepting the offer (and/or selecting an amount), the payment processing service server(s) 104 can originate a capital loan for the merchant. In at least one example, the payment processing service server(s) 104 can provide the Merchant A 100A with a payment instrument 112 that is associated with an approved and/or accepted capital loan offer amount. That is, the payment processing service server(s) 104 can associate the amount of the capital loan ($100.00) with the payment instrument 112 and the payment instrument 112 can be provided to the Merchant A 100A. In an example, a limit associated with the payment instrument 112 can correspond to the approved and/or accepted capital loan amount ($100.00). The Merchant A 100A can then use the payment instrument 112 for purchasing item(s) from merchant(s) of its choice. In some examples, the payment instrument 112 can be a physical card that is mailed to the Merchant A 100A. In other examples, the payment instrument 112 can be a virtual card that is accessible via an application executable on a device of the Merchant A 100A (e.g., Merchant A device 102A), a credit to an account of the Merchant A 100A, or another electronic form of payment.

In at least one example, the Merchant A 100A can be a salon. The Merchant A 100A may need to replenish items for performing salon services and/or for selling to customers of the Merchant A 100A. In such an example, the Merchant B 100B can be a salon supply store. The Merchant A 100A can desire to buy one or more items 114 from the Merchant B 100B. As illustrated, the one or more items 114 can cost more than the approved and/or accepted capital loan amount. For instance, as illustrated in FIG. 1, the one or more items 114 cost $150.00, which is more than the $100.00 capital loan amount (and the limit of the payment instrument 112).

In at least one example, the Merchant B device 102B can include a merchant application that is installed on the Merchant B device 102B to configure the Merchant B device 102B as a POS terminal. That is, the merchant application can configure the Merchant B device 102B to process one or more transactions and transmit transaction data associated with the one or more transactions to the payment processing service server(s) 104. In at least one example, the Merchant B device 102B can send an authorization request 116 (e.g., via the merchant application) to the payment processing service server(s) 104. The authorization request 116 can request authorization of the payment instrument 112 for a cost of a transaction (e.g., for the Merchant A 100A to purchase the one or more items 114 from the Merchant B 100B). That is, the authorization request 116 can request authorization of the payment instrument 112 for $150.00.

As described above, the payment instrument 112 is associated with a limit corresponding to the amount of the capital loan ($100.00). Accordingly, at the time the authorization request 116 is sent to the payment processing service server(s) 104, the payment instrument 112 is not authorized for the cost of the transaction ($150.00). However, techniques described herein are directed to intelligently modifying the amount of the original capital loan at the POS. That is, techniques described herein enable the payment processing service server(s) 104 to determine whether to increase the amount of the capital loan in near real-time. In at least one example, the payment processing service server(s) 104 can increase the amount of the capital loan based on information known about the Merchant A 100A (e.g., inventory and/or catalog levels, appointment schedule, etc.) and/or the transaction for the item(s) 114. That is, in at least one example, the payment processing service server(s) 104 can increase the initial amount of the capital loan from the original capital loan amount ($100.00) to a new or revised loan amount (at least 150.00) that enables the Merchant A 100A to purchase the item(s) 114. In at least one example, the determination to increase the amount of the capital loan can depend on information known about the Merchant A 100A (e.g., MCC, inventory and/or catalog levels, appointment schedule, etc.) and/or the transaction for the item(s) 114. For instance, in at least one example, the payment processing service server(s) 104 can determine to increase the amount of the capital loan based on a determining that the transaction is likely to be associated with a business purpose of the Merchant A 100A. In such an example, if the payment processing service server(s) 104 determine that the transaction is for item(s) that are not related to the business of the Merchant A 100A (e.g., not related to salon services), the payment processing service server(s) 104 may refrain from modifying the amount of the capital loan.

As illustrated in FIG. 1, the item(s) 114 can be determined to be related to the business of the Merchant A 100A, and as such, the payment processing service server(s) 104 can increase the amount of the capital loan to at least the cost of the item(s) 114. The payment processing service server(s) 104 can leverage additional or alternative signals to determine whether to increase the amount of the capital loan at the POS. Responsive to increasing the amount of the capital loan, the payment processing service server(s) 104 can send an authorization approval 118 to the Merchant B device 102B so that the Merchant B device 102B can complete the transaction. In such an example, the payment processing service server(s) 104 can increase the amount of the capital loan in near real-time per a pre-agreement between the Merchant A 100A and the payment processing service (e.g., without a subsequent acceptance), or responsive to an acceptance of the increase by the Merchant A 100A (e.g., via the Merchant B device 102B and/or an application on device of the Merchant A 100A).

As described above, techniques described herein are directed to intelligently modifying the amount of the original capital loan at the POS. That is, techniques described herein enable the payment processing service server(s) 104 to determine whether to increase the amount of the capital loan in near real-time. In at least one example, the payment processing service server(s) 104 can use machine learning based on information associated with other similar merchants (e.g., as determined based on MCC, location, revenue, inventory, etc.) transacting via the payment processing service to determine an affinity between an inventory item (e.g., to be purchased) and the merchant business (e.g., of the purchasing merchant). For instance, in some examples, the payment processing service server(s) 104 can analyze inventory data associated with a purchasing merchant (e.g., the Merchant A 100A) to determine that the inventory of the purchasing merchant is low and thus can determine that item(s) to be purchased to replenish the inventory are for a business purchase of the purchasing merchant. In other examples, the payment processing service server(s) 104 can leverage machine learning to determine an affinity or relatedness score between an item to be purchased and the purchasing merchant (e.g., the Merchant A 100A). In such examples, the purchasing merchant may not have an inventory (e.g., may provide services) or the inventory of the purchasing merchant may not indicate that the item is low and/or even be associated with the item (e.g., the item can be a new item that is being added to the inventory, an item that supports a business of a merchant (e.g., a supply item), etc.). However, based on the determined affinity or relatedness score, the payment processing service server(s) 104 can determine that the item to be purchased is for a business purchase of the purchasing merchant. In some examples, such an affinity or relatedness score can be determined based on inventory data, transaction data, and/or merchant data indicating that other merchants that are similar to the purchasing merchant have purchased a particular item and/or have the particular item in their inventory. That is, the payment processing service server(s) 104 can analyze inventory data, transaction data, and/or merchant data associated with other merchants that are similar to the purchasing merchant utilizing a machine learning mechanism to determine an affinity or relatedness score between an item and a purchasing merchant.

It should be noted that, while FIG. 1 illustrates that the payment processing service issues the payment instrument 112 associated with the capital loan and the payment processing service server(s) 104 determine whether to increase the amount of the capital loan, in at least one example, the payment processing service can provide the payment instrument 112 but the payment instrument can be issued by a third party. In such examples, server(s) associated with the third party can perform techniques (utilizing components as described herein) to intelligently determine whether to increase amounts of capital loans at the POS. That is, third parties can issue payment instruments that are associated with capital loans offered by the payment processing service and, in such examples, can have functional components that are executable by processors to perform techniques as described herein.

Figure 2:
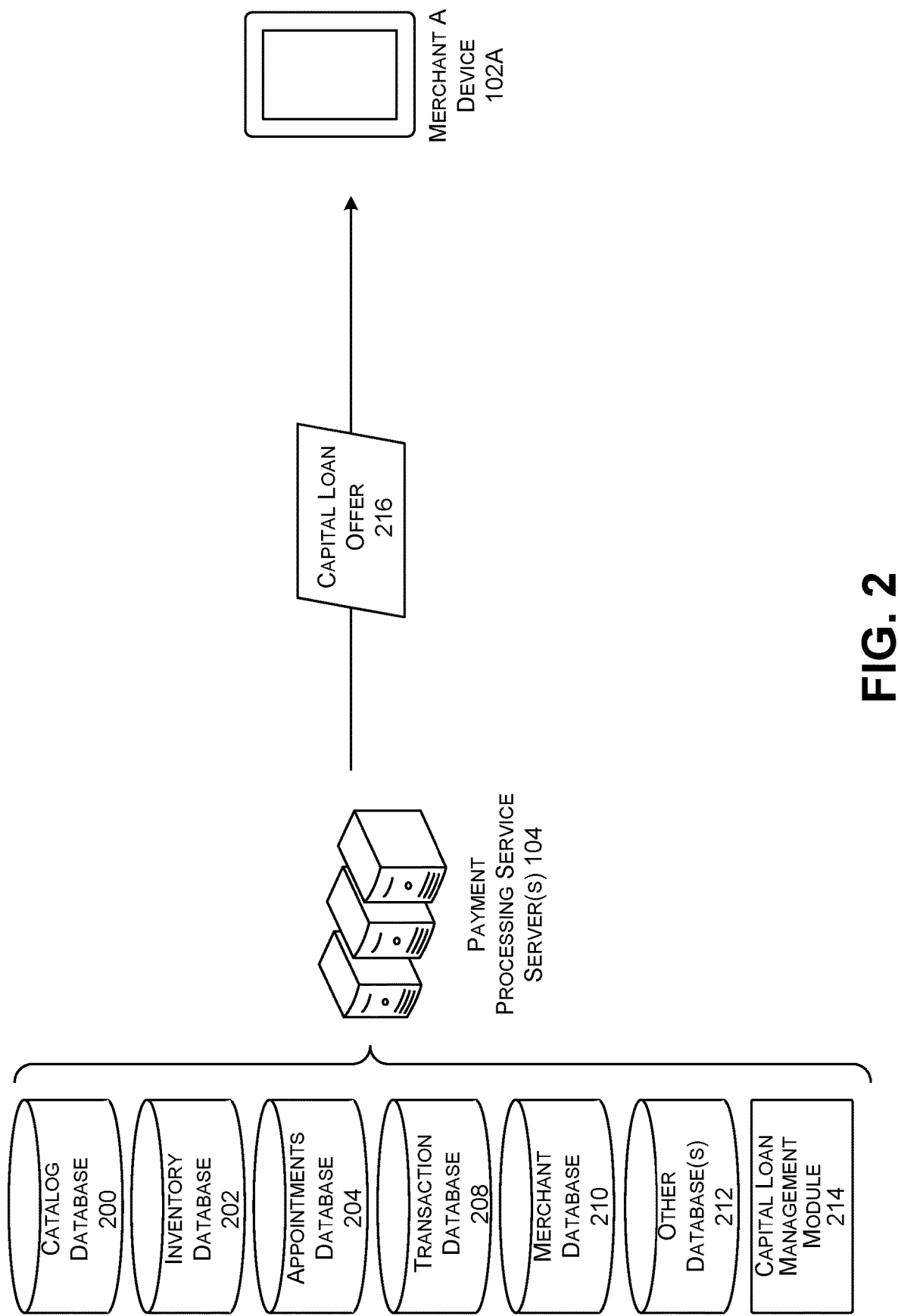
FIG. 2 depicts an illustrative block diagram illustrating an environment for generating and making a capital loan offer as described herein.

FIG. 2 depicts an illustrative block diagram illustrating an environment for generating and making a capital loan offer. As described above, the payment processing service can provide products and/or services to enable merchants to manage aspects of their businesses. For instance, the payment processing service can provide payment processing services for processing payments on behalf of merchants. Additionally or alternatively, the payment processing service can provide products and/or services for maintaining catalogs and/or inventories of merchants. Further, in some examples, the payment processing service can provide products and/or services for managing appointments. Additional or alternative products and/or services can include employee management products and/or services, payroll products and/or services, etc.

The payment processing service can provide various access points to a merchant so that the merchant can access and manage the various products and/or services. As a non-limiting example, the payment processing service can enable a merchant to access and manage the various products and/or services via a web interface, a user interface presented via a merchant device and/or a POS terminal operated by the merchant, etc. As an additional or alternative example, the payment processing service can enable a merchant to access and manage the various products and/or services via a dedicated application executable via a merchant device and/or POS terminal.

FIG. 2 illustrates example components of the payment processing service server(s) 104. For instance, in FIG. 2, the payment processing service server(s) 104 are shown as including a catalog database 200, an inventory database 202, an appointments database 204, a transaction database 208, a merchant database 210, and one or more other databases 212. Each of the databases described above can store data associated with one or more of the products and/or services provided by the payment processing service. While six databases are shown, any number of databases can be used to store such data. For instance, in some examples, a single database can store catalog data, inventory data, appointments data, transaction data, merchant data, etc. In some examples, one or more of the databases can be stored on the payment processing service server(s) 104 and, in other examples, one or more of the databases can be stored remotely and the data stored in association with such database(s) can be accessible to the payment processing service server(s) 104.

The catalog database 200 can be associated with a product and/or service for maintaining a catalog. Such a product and/or service can enable a merchant to access and manage a database (e.g., a catalog database 200) storing data (e.g., catalog data) associated with items that the merchant has available for acquisition (e.g., purchase, rent, trade, borrow, etc.). A catalog can be associated with a plurality of data items. A data item of the plurality of data items can represent an item that the merchant has available for acquisition. The data item can identify the item and can be associated with additional data that represents information about the item. For instance, the additional data can include attribute(s) of the item, a price of the item, a discount available for the item, taxes applicable to the item, a location of the item (e.g., where the item is located in a warehouse), image(s) of the item, etc. In at least one example, attribute(s) can correspond to variants of the item and can be represented by attribute values. A creator of the catalog can arbitrarily specify attribute names and allowed values for each of the attributes, dependent on the actual characteristics of an item. For instance, attribute names can include "color" and "size" and attribute values can include "red" or "green" or "small," "medium," or "large," for each attribute name, respectively.

The inventory database 202 can be associated with a product and/or service for maintaining an inventory. Such a product and/or service can enable a merchant to access and manage a database (e.g., an inventory database 202) storing data (e.g., inventory data) associated with a quantity of each item that the merchant has available. The merchant can update the inventory following an inventory activity (i.e., where entities associated with the merchant manually determine quantities of each of the items that the merchant has available), upon receiving new item(s) that are to be offered for acquisition, after item(s) are acquired by customers, etc. In additional or alternative examples, the payment processing service server(s) 104 can update the inventory based on information received from the merchant and/or other sources and/or systems. For instance, in some examples, the payment processing service can track individual instances of an item as the instance moves through merchant(s) associated with a product supply chain.

In at least one example, an inventory can include additional information associated with items in the inventory. For instance, data associated with such additional information can include current ownership (i.e., which merchant in the product supply chain has the item), location, sale-related events, etc. In some examples, the catalog can cross-reference the inventory. That is, in some examples, the additional data associated with an item can include a quantity associated with the item as indicated in the inventory and/or additional information that is available via the inventory.

Inventor data and/or catalog data can be analyzed to indicate inventory trends (e.g., inventory turns, items in highest demand, location influence, etc.), compute profit margins (e.g., based on supplier cost data), etc.

The appointments database 204 can be associated with a product and/or service for managing appointments. Such a product and/or service can enable a merchant to access and manage a database (e.g., an appointments database 204) storing data (e.g., appointments data) associated with scheduled and/or available appointments. In at least one example, the merchant can add appointments to the appointments database 204, modify an existing appointment in the appointments database 204, remove appointments in the appointments database 204, etc. In some examples, a data item representing an appointment can be associated with a date, a start time, an end time and/or an allotted time, a service, one or more products needed to complete the service (if applicable), a cost, a name of a customer (if scheduled), information associated with the customer (if scheduled), a payment instrument (if scheduled and/or provided), etc.

The transaction database 208 can be associated with a product and/or service for processing payments. As described above, in at least one example, a payment processing service can offer POS systems to facilitate the payment processing service. As described above, a merchant can be associated with a merchant device configured as a POS terminal, which can be associated with a payment reader. In at least one example, the merchant device can include a merchant application that is installed on the merchant device to configure the merchant device as a POS terminal. In at least one example, the merchant application can configure the merchant device to, collectively with the payment reader, process one or more transactions and transmit transaction data associated with the one or more transactions to the payment processing service server(s) 104. Such transaction data, which can include, but is not limited to encrypted payment data, user authentication data, purchase amount information, point-of-purchase information, etc., can be stored in the transaction database 208. In at least one example, a data item associated with a transaction can include item(s) acquired via the transaction, a payment instrument associated with the transaction, a cost of the transaction, parties (e.g., customer, merchant) to the transaction, etc. Data in the transaction database 208 can be analyzed to determine SKU-level sales history (which can be used to assess top-selling items), transaction histories between merchants and customers, purchasing patterns (e.g., average purchase size, types of payment instruments used, etc.), sales trends (e.g., increases/decreases in sales observed and/or expected, etc.), etc. Furthermore, transaction data can be analyzed to determine customer feedback, customer behavior (e.g., repeat purchases, adjacent product purchases, increasing/decreasing order sizes, diversity of purchases, etc.) across merchants that subscribe to services offered by the payment processing service.

In at least one example, the payment processing service server(s) 104 can store merchant data in a merchant database

210. As described above, the merchant data can include, but is not limited to, identifiers of the merchants, MCCs of the merchants, items offered for sale by merchants, hardware (e.g., device type) used by the merchants, previous loans made to the merchants, previous defaults on said loans, indications of risk (e.g., based at least in part on fraud, chargeback, etc.) associated with the merchants, etc. In at least one example, the merchant database 210 can be organized in merchant profiles as described below. In at least one example, merchant data can be analyzed to assess the health of a merchant (e.g., as determined by growth in units and/or dollars), the sophistication of a merchant (e.g., as determined by velocity and acceleration of usage of products and/or services offered by the payment processing service, etc.), the number of locations (e.g., recent additions or closures, etc.), etc.

Additional or alternative databases 212 are also within the scope of this disclosure. For instance, the other databases 212 can include an employee management database which stores employee-specific usage patterns (e.g., time-in, time-out, etc.), employee compensation information (e.g., salary, payroll information, tax information, etc.), employee management information (e.g., hiring, firing, turnover), etc. Furthermore, the other database(s) 212 can include an invoice database storing data associated with invoices generated on behalf of one or more merchants. The invoice data can be analyzed to determine a cadence and/or frequency at which invoices are generated, volumes of transactions, types of transactions (e.g., card present, card not present, etc.), etc. Other databases are within the scope of this disclosure.

As described above, the payment processing service can offer additional or alternative products and/or services. While six databases are shown, in some examples, the payment processing service server(s) 104 can include a database for each product or service offered. In some examples, products and/or services can utilize data from one or more databases associated with the payment processing service server(s) 104.

In at least one example, the payment processing service server(s) 104 can include a capital loan management module 214. The capital loan management module 214 can access data from one or more of the databases (e.g., the catalog database 200, the inventory database 202, the appointments database 204, the transaction database 208, the merchant database 210, the other databases(s) 212, etc.) and can determine whether a merchant qualifies for a capital loan. In at least one example, the payment processing service server(s) 104 can utilize one or more risk analysis algorithms to make such a determination. In at least one example, the one or more risk analysis algorithms are trained via machine learning mechanisms to output a prediction regarding the creditworthiness of a merchant. In at least one example, the capital loan management module 214 can determine an amount of the capital loan (e.g., a range, a discrete amount, etc.), terms for the capital loan (e.g., interest to be collected, repayment term, repayment amounts, etc.), etc.

Responsive to determining that a merchant is eligible for a capital loan, the capital loan management module 214 can send an offer 216 to a merchant device, such as Merchant A device 102A, described above with reference to FIG. 1. The offer 216 can include an indication that the associated merchant (e.g., Merchant A 100A) is eligible for a capital loan, an amount of the capital loan, terms for the capital loan, etc. In some examples, the offer 216 can be associated with a text message, an email, a push notification, etc. In additional or alternative examples, the offer 216 can be presented via a user interface for presenting capital loan offers. For instance, in at least one example, the Merchant A device 102A can present the offer 216 in association with a dashboard. As described above, in at least one example, the offer 216 can be associated with a selectable control, the actuation of which sends an indication to the payment processing service server(s) 104 that the Merchant A 100A accepts the offer.

In at least one example, the capital loan management module 214 can leverage data associated with the catalog database 200, the inventory database 202, the appointments database 204, the transaction database 208, the merchant database 210, the other database(s) 212, etc. to determine a timing associated with sending the capital loan offer. In some examples, the capital loan management module 214 can utilize a machine trained model to determine the timing. A machine trained model can be a model, trained by a machine learning mechanism (e.g., supervised, unsupervised, deep-learning, etc.) that analyzes training data and learns timing for sending capital loan offers. That is, a machine learning mechanism can analyze catalog data, inventory data, appointments data, transaction data, merchant data, data associated with previously offered capital loans, data indicative of whether such capital loan offers were accepted and/or how such resulting capital loans were used, etc. to predict when capital loan offers should be made to merchants to benefit the merchants. The machine trained model can then be used to predict a timing for sending a capital loan offer to a merchant. For instance, based at least in part on determining that a merchant's inventory is below a threshold (as determined from the inventory database 202) and that the merchant has a number of upcoming appointments above a threshold (as determined from the appointments database 204), the capital loan management module 214 can leverage the machine trained model to determine that a capital loan offer should be sent to the merchant (e.g., to assist the merchant in purchasing inventory to satisfy the upcoming appointments). In some examples, the capital loan management module 214 can determine a channel (e.g., text message, email, push notification, in-app notification, etc.) for sending the offer 216 and/or a presentation associated with the offer 216 in addition to, or as an alternative of, the timing.

Figure 3:
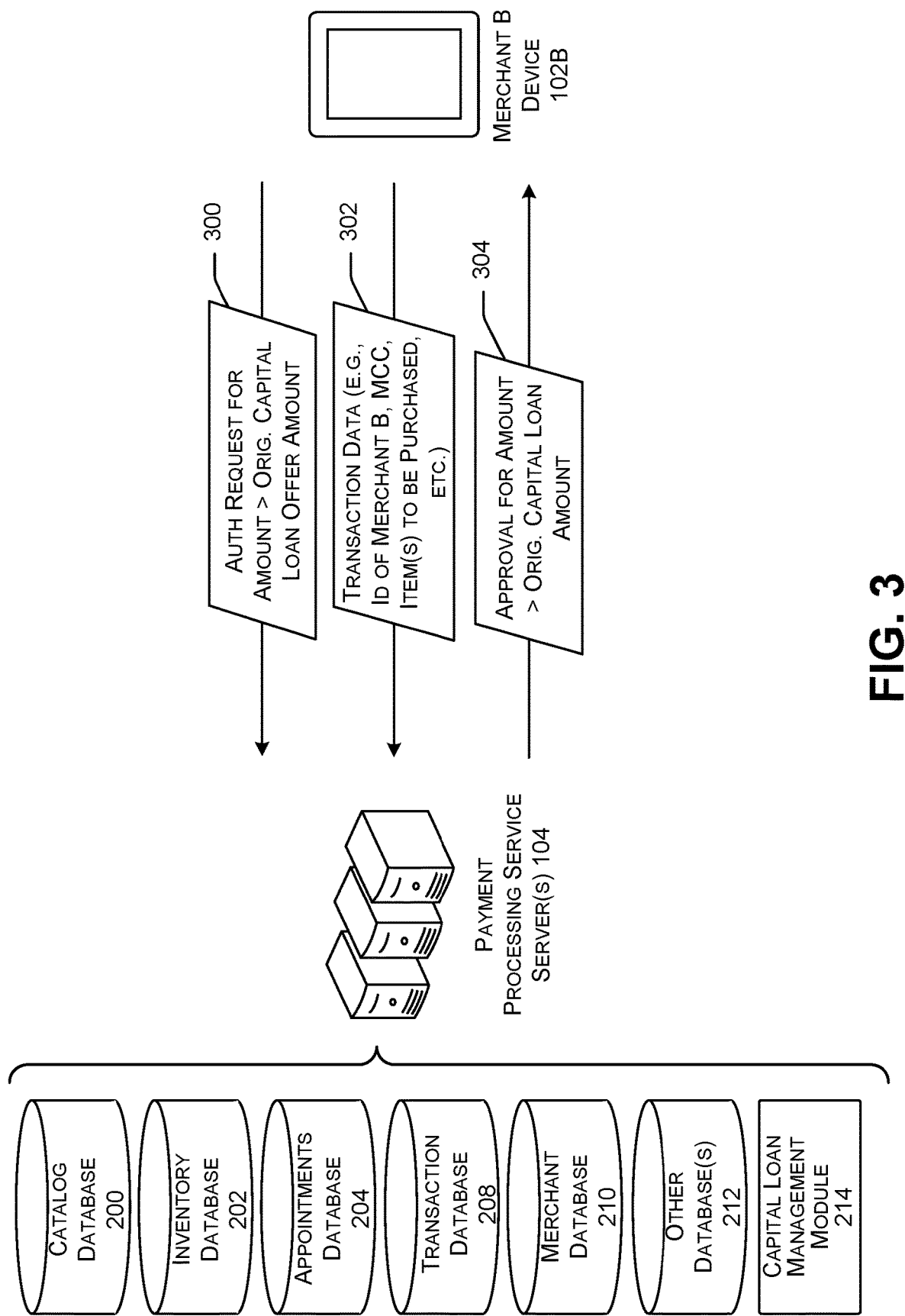
FIG. 3 depicts an illustrative block diagram illustrating an environment for intelligently modifying an amount of a capital loan at a point-of-sale as described herein.

FIG. 3 depicts an illustrative block diagram illustrating an environment for intelligently modifying an amount of a capital loan at a point-of-sale. FIG. 3 includes the catalog database 200, the inventory database 202, the appointments database 204, the transaction database 208, the merchant database 210, the other database(s) 212, and the capital loan management module 214 as described above with reference to FIG. 2.

As described above, in some examples, the payment processing service server(s) 104 can associate an amount of an accepted capital loan offer with a payment instrument, which can be provided to the merchant that accepted the capital loan offer. The merchant can then use the payment instrument to purchase item(s) from other merchant(s). In at least one example, the payment processing service server(s) 104 can receive a request 300 to authorize a payment instrument for a cost of item(s) to be purchased from another merchant that is greater than a previously accepted capital loan amount. The request 300 can be sent by a device operated by a merchant, such as Merchant B device 102B. In some examples, as described above, the device operated by the merchant can be a POS terminal.

In at least one example, the request 300 can be associated with transaction data 302. In some examples, the transaction data 302 can identify the merchant (e.g., the Merchant B 100B) from whom the merchant (e.g., the Merchant A 100A) is purchasing item(s), identify a MCC associated with the merchant (e.g., the Merchant B 100B) from whom the merchant (e.g., the Merchant A 100A) is purchasing item(s), item(s) to be purchased, a cost of the item(s) to be purchased, etc. While the request 300 and the transaction data 302 are shown as two data transmissions, in additional or alternative examples, the request 300 and the transaction data 302 can be associated with a same data transmission.

The payment processing service server(s) 104 can receive the request 300 and the transaction data 302, and can compare the request 300 with the terms of the capital loan corresponding to the payment instrument. That is, the payment processing service server(s) 104 can determine whether the cost of the item(s) is greater than the accepted capital loan amount (e.g., the limit of the payment instrument is exceeded). Based at least in part on determining that the cost of the item(s) is greater than the accepted capital loan amount, the payment processing service server(s) 104 can notify the capital loan management module 214 that the capital loan amount is insufficient and/or can send a request to the capital loan management module 214 to increase the amount of the capital loan. In at least one example, the capital loan management module 214 can determine whether to increase the amount of the capital loan. In at least one example, the capital loan management module 214 can leverage data stored in the catalog database 200, the inventory database 202, the appointments database 204, the transaction database 208, the merchant database 210, the other databases(s) 212, etc. to determine whether to increase the amount of the capital loan amount.

That is, the capital loan management module 214 can leverage data stored in the catalog database 200, the inventory database 202, the appointments database 204, the transaction database 208, the merchant database 210, the other databases(s) 212, etc. to determine whether to increase the amount of the capital loan in near real-time. In at least one example, the capital loan management module 214 can use machine learning based on information associated with merchants that are similar to a purchasing merchant (e.g., as determined based on MCC, location, revenue, inventory, etc.) that are transacting via the payment processing service to determine an affinity between an inventory item (e.g., to be purchased) and the merchant business (e.g., of the purchasing merchant). For instance, in some examples, the capital loan management module 214 can analyze inventory data in the inventory database 202 to determine that the inventory of the purchasing merchant is low, and thus can determine that item(s) to be purchased (e.g., as indicated by the transaction data 302) are to replenish the inventory of the purchasing merchant. Thus, the capital loan management module 214 can determine that the purchase is for a business purchase of the purchasing merchant. In other examples, the capital loan management module 214 can leverage machine learning to determine an affinity or relatedness score between an item to be purchased (e.g., as indicated by the transaction data 302) and the purchasing merchant. In such examples, the purchasing merchant may not have an inventory (e.g., may provide services) or the inventory of the purchasing merchant may not indicate that the item is low and/or even be associated with the item (e.g., the item can be a new item that is being added to the inventory, an item that supports a business of a merchant (e.g., a supply item), etc.). However, based on the determined affinity or relatedness score, the capital loan management module 214 can determine that the item to be purchased is for a business purchase of the purchasing merchant. In some examples, such an affinity or relatedness score can be determined based on data stored in the catalog database 200, the inventory database 202, the appointments database 204, the transaction database 208, the merchant database 210, the other databases(s) 212, etc., which can indicate that other merchants that are similar to the purchasing merchant have purchased a particular item and/or have the particular item in their inventory. That is, the capital loan management module 214 can analyze data stored in the catalog database 200, the inventory database 202, the appointments database 204, the transaction database 208, the merchant database 210, the other databases(s) 212, etc. associated with other merchants that are similar to the purchasing merchant utilizing a machine learning mechanism to determine an affinity or relatedness score between an item and a purchasing merchant. In at least one example, the affinity and/or relatedness score can be a signal used to determine a likelihood that a transaction is associated with a business purpose of a merchant, as described below.

In at least one example, the capital loan management module 214 can analyze the request 300 and the transaction data 302 in view of data stored in the inventory database 202, the appointments database 204, the transaction database 208, the merchant database 210, the other database(s) 212, etc., or data derived therefrom, to determine whether the transaction is likely to be associated with a business purpose of the merchant. For instance, the capital loan management module 214 can utilize a machine trained model to determine a likelihood that the transaction is associated with a business purpose of the merchant. A machine trained model can be a model, trained by a machine learning mechanism (e.g., supervised, unsupervised, deep-learning, etc.) that analyzes training data and learns a likelihood that a transaction is associated with a business purpose of a merchant. That is, a machine learning mechanism can analyze catalog data, inventory data, appointments data, transaction data (as described above), merchant data, transaction data associated with transactions wherein a payment instrument associated with a capital loan was used (e.g., identification of merchant, MCC, item(s) to be purchased, etc.), etc. to predict likelihoods that transactions are associated with business purposes of merchants. In at least one example, a likelihood can be associated with a score, a number (e.g., 0-1), a percentage, etc. In some examples, the machine trained model can be updated based on learning how funds availed via capital loans issued in association with a payment instrument are spent (e.g., did merchants' inventory increase after a purchase made via the payment instrument, did merchants request other capital loans within a period of time following the issuance of other capital loans, etc.). While a machine trained model is described above, in at least one example, the capital loan management module 214 can utilize a statistical analysis or other means for analyzing the request 300 and the transaction data 302 in view of data stored in the inventory database 202, the appointments database 204, the transaction database 208, the merchant database 210, the other database(s) 212, etc. to determine whether a transaction is associated with a business purpose of the merchant.

As a non-limiting example, the capital loan management module 214 can utilize a machine trained model to analyze catalog data, inventory data, appointments data, transaction data (as described above), and/or merchant data associated with the Merchant A 100A described above with reference to FIG. 1. That is, the catalog data, inventory data, appointments data, transaction data (as described above), and/or merchant data can indicate that the Merchant A 100A provides salon services. In at least one example, the request 300 and the transaction data 302 can indicate that the merchant associated with the Merchant B device 102B (e.g., Merchant B 100B) is identified as "XYZ Beauty Supply" and is associated with an MCC for salon products, and that the item(s) to be purchased include hair color, shampoo, and conditioner. As a result, the machine trained model can output a likelihood that the transaction to which the request 300 and the transaction data 302 correspond is associated with a business purpose of the Merchant A 100A. In such an example, the likelihood is above a threshold indicating that the transaction is likely to be associated with a business purpose of the Merchant A 100A.

As described above, the catalog data, inventory data, appointments data, transaction data (as described above), and/or merchant data, or data derived therefrom, can be used to determine a likelihood that a transaction is associated with a purpose of a merchant's business. For instance, catalog data and/or inventory data can indicate that a merchant is in need of new item(s), which can be indicative of which item types are likely to be associated with a business purpose of the merchant and/or which merchant types are likely to supply such item(s). Or, appointments data can indicate that a merchant has upcoming appointments requiring particular item(s), which can be indicative of which item types are likely to be associated with a business purpose of the merchant and/or which merchant types are likely to supply such item(s). In some examples, for instance when the merchant (seller) subscribes to products and/or services associated with the payment processing service, the transaction data 302 can include an identity of a merchant (e.g., a merchant identifier), a MCC of the merchant, item(s) to be purchased, etc. In such an example, the machine trained model can perform an item-level assessment in determining whether a transaction is likely to be associated with a business purpose of a merchant. In other examples, for instance when the merchant (seller) does not subscribe to products and/or services associated with the payment processing service and/or item-level information is not available, the transaction data 302 may be less robust and may only include an identity of a merchant or an MCC. In such examples, the machine trained model may not be able to perform an item-level assessment, but may still be able to determine a likelihood that a transaction is associated with a business purpose of a merchant based on the identity of the merchant or the MCC.

As described above, in some examples, the capital loan management module 214 can leverage an affinity and/or a relatedness score between an item and a merchant to determine the likelihood that a transaction is associated with a business purpose of the merchant. In such examples, catalog data, inventory data, appointments data, transaction data, and/or merchant data, or data derived therefrom, that is associated with merchants determined to be similar to the merchant can be used to determine the affinity and/or the relatedness score. As described above, in at least one example, a machine trained model can be utilized to analyze catalog data, inventory data, appointments data, transaction data, and/or merchant data, or data derived therefrom, that is associated with merchants determined to be similar to the merchant can be used to determine the affinity and/or the relatedness score, which can be used for generating the likelihood that a transaction is associated with a business purpose of the merchant.

In at least one example, the capital loan management module 214 can compare the output of the machine trained model with a threshold. Responsive to determining that the likelihood meets or exceeds a threshold, the capital loan management module 214 can determine that the transaction is likely to be associated with a business purpose. In such examples, the capital loan management module 214 can determine to increase the amount of the capital loan to a new amount. The new amount can be at least as much as the cost of the item(s). Responsive to increasing the amount of the capital loan, the payment processing service server(s) 104 can authorize the payment instrument and can send an indication 304 of approval for the amount associated with the authorization request 300 to the requesting device, which is illustrated as the Merchant B device 102B described above with reference to FIG. 1. That is, the indication 304 can indicate that the authorization request is approved.

In at least one example, the capital loan management module 214 can additionally or alternatively utilize one or more other signals to determine whether to increase an amount of a capital loan. For instance, in at least one example, the capital loan management module 214 can analyze transaction data (e.g., from the transaction database 208) to determine a state of a merchant's sales and/or forecast future sales. Based on determining that the state of the merchant's sales indicates that the merchant is financially stable and/or that the forecasted future sales are likely to stay the same and/or increase, the capital loan management module 214 can determine to increase the amount of the capital loan. However, based on determining that the state of the merchant's sales indicates that the merchant is not financially stable and/or that the forecasted future sales are likely to decrease, the capital loan management module 214 can determine not to increase the amount of the capital loan. Another signal can depend on a state of the merchant's catalog and/or inventory. If the state of the merchant's catalog and/or inventory indicates that the merchant does not need to add more item(s) to the catalog and/or inventory, the capital loan management module 214 can determine not to increase the amount of the capital loan. Or, if the state of the merchant's catalog and/or inventory indicates that the merchant needs to add more item(s) to the catalog and/or inventory, the capital loan management module 214 can determine to increase the amount of the capital loan. Yet another signal can depend on upcoming appointments with the merchant, as can be determined from appointment data associated with the appointments database 206. Based at least in part on determining that the merchant has a number of appointments above a threshold (indicating that the merchant's services are in high demand and/or that the merchant will need various items to provide the services), the capital loan management module 214 can determine to increase the amount of the capital loan. Conversely, based at least in part on determining that the merchant has a number of appointments below a threshold (indicating that the merchant's services are not in high demand and/or that the merchant will not need various items to provide the services), the capital loan management module 214 can determine not to increase the amount of the capital loan. Additional or alternative signals can include upcoming payroll payments, time of day, time of year, seasons, calendar events, etc.

In at least one example, the capital loan management module 214 can utilize a machine trained model for analyzing the one or more signals to determine whether to increase the amount of the capital loan. A machine trained model can be a model, trained by a machine learning mechanism (e.g., supervised, unsupervised, deep-learning, etc.) that analyzes training data and learns whether to increase an amount of a capital loan. In some examples, some signals can be weighted to represent the significance of such signals. In other examples, each signal can be considered equally in determining whether to increase the amount of the capital loan. While a machine trained model is described above, in at least one example, the capital loan management module 214 can utilize a statistical analysis or other means for determining whether to increase the amount of the capital loan at the POS.

As described above, in some examples, the capital loan management module 214 can determine to increase the amount of the capital loan to the amount associated with the authorization request. On the other hand, in at least one example, the capital loan management module 214 can determine to increase the amount of the capital loan to an amount greater than the amount associated with the authorization request. In such an example, a risk analysis algorithm can be utilized to determine a new amount for the capital loan management module 214.

FIGS. 4-7 are flow diagrams illustrating example processes according to some implementations. The processes of FIGS. 4-7 are illustrated as collections of blocks in logical flow diagrams, which represent a sequence of operations, some or all of which can be implemented in hardware, software or a combination thereof. In the context of software, the blocks can represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 4-7 can be combined with some or all of the operations illustrated in others of FIGS. 4-7. For discussion purposes, the processes are described with reference to the environments, architectures and devices described in FIGS. 1-3 above, although the processes can be implemented in a wide variety of other environments, architectures and devices.

Various instructions, methods and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various implementations. An implementation of these modules and techniques can be stored on computer storage media or transmitted across some form of communication media.

Figure 4:
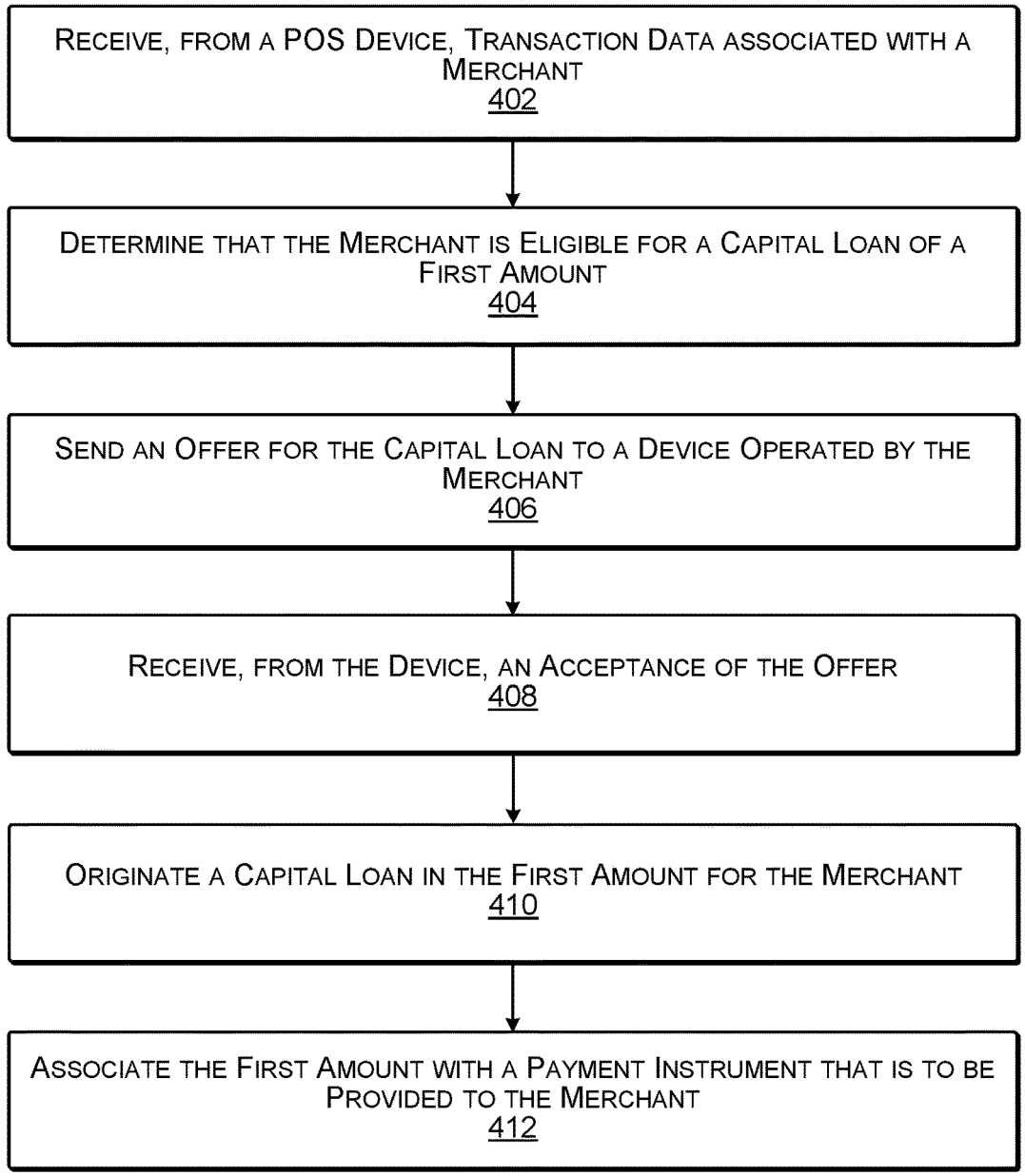
FIG. 4 depicts a non-limiting flow diagram illustrating a method for generating and making a capital loan offer as described herein.

FIG. 4 depicts a non-limiting flow diagram illustrating a method 400 for generating and making a capital loan offer.

Block 402 illustrates receiving, from a POS device, transaction data associated with a merchant. As described above, in at least one example, a payment processing service can offer POS systems to facilitate payment processing services. As described above, a merchant can be associated with a merchant device configured as a POS terminal, which can be associated with a payment reader. In at least one example, the merchant device can include a merchant application that is installed on the merchant device to configure the merchant device as a POS terminal. In at least one example, the merchant application can configure the merchant device to, collectively with the payment reader, process one or more transactions and transmit transaction data associated with the one or more transactions to the payment processing service server(s) 104. Such transaction data, which can include, but is not limited to encrypted payment data, user authentication data, purchase amount information, point-of-purchase information, etc., can be stored in the transaction database 208.

As described above, in addition to receiving transaction data, the payment processing service server(s) 104 can receive, or otherwise determine, other data (e.g., catalog data, inventory data, appointments data, merchant data, etc.), which can be stored in the catalog database 200, the inventory database 202, the appointments database 204, the merchant database 210, the other database(s) 212, etc.

Block 404 illustrates determining that the merchant is eligible for a capital loan of a first amount. As described above, in at least one example, the payment processing service server(s) 104 can include a capital loan management module 214. The capital loan management module 214 can access data from one or more of the databases (e.g., the catalog database 200, the inventory database 202, the appointments database 204, the transaction database 208, the merchant database 210, the other databases(s) 212, etc.) and can determine whether a merchant qualifies for a capital loan. In at least one example, the payment processing service server(s) 104 can utilize one or more risk analysis algorithms to make such a determination. In at least one example, the one or more risk analysis algorithms are trained via machine learning mechanisms to output a prediction regarding the creditworthiness of a merchant. In at least one example, the capital loan management module 214 can determine that the creditworthiness of the merchant meets or exceeds a threshold and, as such, the merchant is eligible for a capital loan. As described above, in at least one example, the capital loan management module 214 can determine an amount of the capital loan (e.g., a range, a discrete amount, etc.), terms for the capital loan (e.g., interest to be collected, repayment term, repayment amounts, etc.), etc.

Block 406 illustrates sending an offer for the capital loan to a device operated by the merchant. Responsive to determining that a merchant is eligible for a capital loan, the capital loan management module 214 can send an offer to a merchant device. The offer can include an indication that the associated merchant is eligible for a capital loan, an amount of the capital loan, terms for the capital loan, etc. In some examples, the offer can be associated with a text message, an email, a push notification, etc. In additional or alternative examples, the offer can be presented via a user interface for presenting capital loan offers. For instance, in at least one example, the merchant device can present the offer in association with a dashboard. As described above, in at least one example, the offer can be associated with a selectable control, the actuation of which sends an indication to the payment processing service server(s) 104 that the merchant accepts the offer.

As described above, in at least one example, the capital loan management module 214 can leverage data associated with the catalog database 200, the inventory database 202, the appointments database 204, the transaction database 208, the merchant database 210, the other databases(s) 212, etc. to determine a timing associated with sending the capital loan offer. In some examples, the capital loan management module 214 can utilize a machine trained model to determine the timing. In some examples, the capital loan management module 214 can determine a channel (e.g., text message, email, push notification, in-app notification, etc.) for sending the offer 216 and/or a presentation associated with the offer 216 in addition to, or as an alternative of, the timing.

Block 408 illustrates receiving, from the device, an acceptance of the offer. In at least one example, the capital loan management module 214 can receive an indication that the merchant accepts the offer from the merchant device. In some examples, the merchant can actuate a selectable control, as described above. In other examples, the merchant can reply to a text message, email, push notification, etc. indicating acceptance of the offer. In additional or alternative examples, the merchant can provide any other affirmation of acceptance of the loan.

Block 410 illustrates originating a capital loan in the first amount for the merchant. Responsive to the merchant accepting the offer, the payment processing service can originate a capital loan for the merchant. That is, the capital loan management module 214 can send one or more requests for information to the merchant device to facilitate originating and processing the loan. In at least one example, the capital loan management module 214 can send a request for an affirmation that the merchant agrees to the terms of the loan (e.g., in addition to actuating the selectable control associated with the capital offer).

Block 412 illustrates associating the first amount with a payment instrument that is to be provided to the merchant. Responsive to receiving an affirmation that the merchant agrees to the terms of the loan, the capital loan management module 214 can associate an amount of funds corresponding to the amount of the capital loan with a payment instrument. In some examples, the payment instrument can be a physical card that is mailed to the merchant. In other examples, the payment instrument can be a virtual card that is accessible via an application executable on a device of the merchant, an account credit, or another electronic form of payment. In an example, a limit associated with the payment instrument can correspond to the approved and/or accepted capital loan amount.

Figure 5:
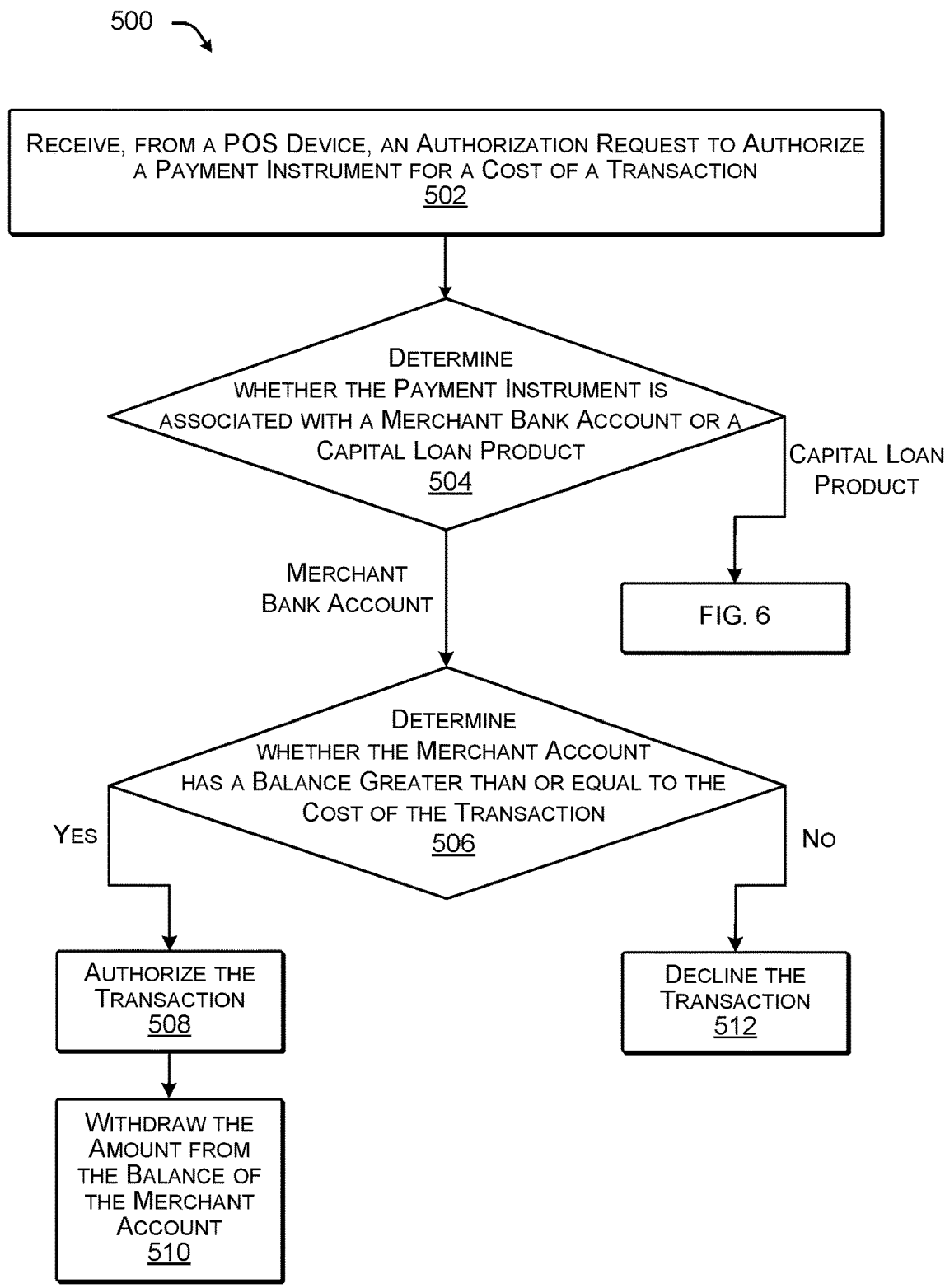
FIG. 5 depicts a non-limiting flow diagram illustrating a method for processing an authorization request associated with a payment instrument as described herein.

FIG. 5 depicts a non-limiting flow diagram illustrating a method 500 for processing an authorization request associated with a payment instrument.

Block 502 illustrates receiving, from a POS device, an authorization request to authorize a payment instrument for a cost of a transaction. As described above, in at least one example, a merchant device can include a merchant application that is installed on the merchant device to configure the merchant device as a POS terminal. That is, the merchant application can configure the merchant device to process one or more transactions and transmit transaction data associated with the one or more transactions to the payment processing service server(s) 104. In at least one example, the merchant device can send an authorization request (e.g., via the merchant application) to the payment processing service server(s) 104. The authorization request can request authorization of the payment instrument for a cost of a transaction. In at least one example, the authorization request can be associated with transaction data, which can include encrypted payment data (e.g., which can identify the payment instrument, etc.), user authentication data, purchase amount information, point-of-purchase information, etc. For instance, the point-of-purchase information can include an identity of a merchant, an MCC, item(s) to be purchased, etc., as described above.

Block 504 illustrates determining whether the payment instrument is associated with a merchant bank account or a capital loan product. In at least one example, the payment processing service server(s) 104 can analyze the transaction data to determine whether the payment instrument is associated with a merchant bank account or a capital loan product. For instance, in at least one example, the encrypted payment data can identify the payment instrument, which may be linked to a merchant account (associated with the payment processing service, e.g., for depositing funds from transactions processed by the payment processing service, etc.) or a capital loan product. Based at least in part on determining that the payment instrument is associated with a merchant bank account, the payment processing service server(s) 104 can determine whether the merchant account has a balance greater than or equal to the cost of the transaction. That is, the payment processing service server(s) 104 can access the merchant account and determine whether the merchant account has a balance greater than or equal to the cost of the transaction. Based at least in part on determining that the merchant account has a balance greater than or equal to the cost of the transaction, the payment processing service server(s) 104 can authorize the transaction, as illustrated in block 508, and withdraw the amount from the balance of the merchant account, as illustrated in block 510. Based at least in part on determining that the merchant account does not have a balance greater than or equal to the cost of the transaction, the payment processing service server(s) 104 can decline the transaction, as illustrated in block 512.

Based at least in part on determining that the payment instrument is associated with a capital loan product, process 500 can continue as described in FIG. 6, below.

Figure 6:
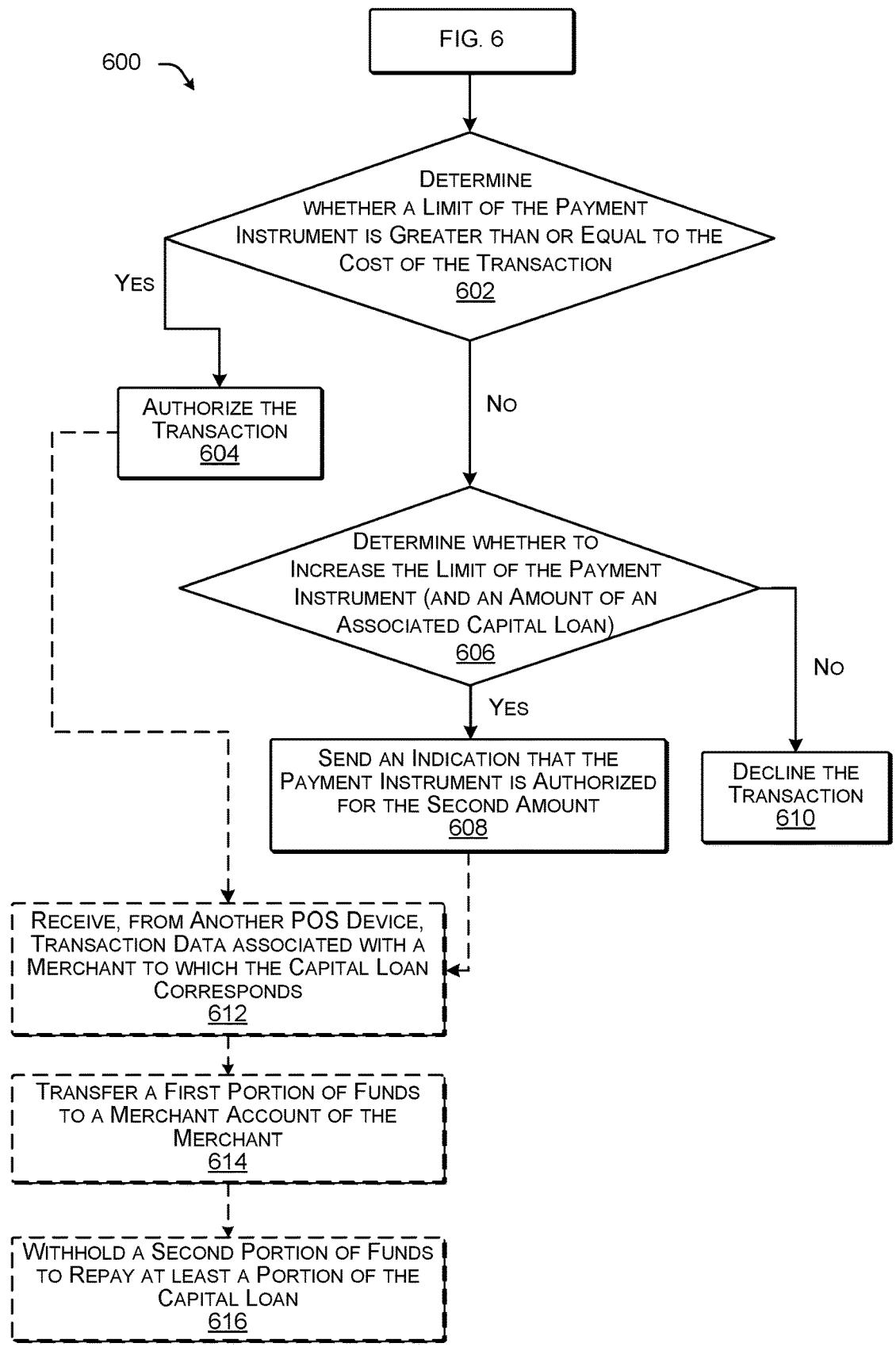
FIG. 6 depicts a non-limiting flow diagram illustrating a method for intelligently modifying an amount of a capital loan at a point-of-sale as described herein.

FIG. 6 depicts a non-limiting flow diagram illustrating a method 600 for intelligently modifying an amount of a capital loan at a point-of-sale.

Block 602 illustrates determining whether a limit of the payment instrument is greater than or equal to the cost of the transaction. In at least one example, the payment processing service server(s) 104 can analyze the transaction data to determine whether the payment instrument is associated with a merchant bank account or a capital loan product. For instance, in at least one example, the encrypted payment data can identify the payment instrument, which may be linked to a merchant account or a capital loan product. Based at least in part on determining that the payment instrument is associated with a capital loan product, the payment processing service server(s) 104 can access data associated with the payment instrument to determine a limit associated with the payment instrument. Based at least in part on determining that the limit of the payment instrument is greater than or equal to the cost of the transaction, the payment processing service server(s) 104 can authorize the transaction as shown in block 604. Responsive to authorizing the transaction, the payment processing service server(s) can withdraw an amount of funds corresponding to the cost of the transaction from the balance of the payment instrument.

Based at least in part on determining that the limit of the payment instrument is less than the cost of the transaction, the payment processing service server(s) 104 can determine whether to increase the limit of the payment instrument (and an amount of an associated capital loan), as illustrated in block 606. In at least one example, based at least in part on determining that the limit of the payment instrument is less than the cost of the transaction, the payment processing service server(s) 104 can send a request to the capital loan management module 214 to increase the limit of the payment instrument. In at least one example, the capital loan management module 214 can analyze the authorization request (and associated transaction data) in view of data stored in the catalog database 200, the inventory database 202, the appointments database 204, the transaction database 208, the merchant database 210, the other databases(s) 212, etc. to determine whether the transaction is likely to be associated with a business purpose of the merchant. Additional details associated with such a determination are described below with reference to FIG. 7. As described above, the capital loan management module 214 can analyze the catalog database 200, the inventory database 202, the appointments database 204, the transaction database 208, the merchant database 210, the other databases(s) 212, etc. to determine one or more other signals for determining whether to increase the amount of the capital loan. Based on the capital loan management module 214 determining to increase the amount of the capital loan, the capital loan management module 214 can increase the limit of the payment instrument (and the amount of the associated capital loan). That is, the capital loan management module 214 can associate the new amount of the capital loan with the payment instrument. Based at least in part on determining to increase the limit of the payment instrument (and the amount of the associated capital loan), the payment processing service server(s) 104 can send an indication that the payment instrument is authorized for the second amount, as illustrated in block 608.

Based at least in part on determining not to increase the limit of the payment instrument (and the amount of the associated capital loan), the payment processing service server(s) 104 can decline the transaction, as illustrated in block 610.

In at least one example, a merchant can repay a capital loan with receipts from transactions processed by the payment processing service. For instance, in at least one example, the payment processing service server(s) 104 can receive, from another POS device, transaction data associated with a merchant to which the capital loan corresponds, as illustrated in block 612. As described above, in at least one example, a payment processing service can offer POS systems to facilitate payment processing services. As described above, a merchant can be associated with a merchant device configured as a POS terminal, which can be associated with a payment reader. The POS terminal and payment reader can collectively process transaction(s) between a merchant and customer(s). The POS terminal can send transaction data associated with the transaction(s) to the payment processing service for payment processing. Such transaction data, which can include, but is not limited to encrypted payment data, user authentication data, purchase amount information, point-of-purchase information, etc., can be stored in the transaction database 208. In at least one example, the payment processing service server(s) 104 can receive transaction data after originating and funding the capital loan.

Block 614 illustrates transferring a first portion of funds to a merchant account associated with the merchant. In some examples, the payment processing service server(s) 104 can transfer at least some funds associated with one or more of the transactions to a merchant account associated with the merchant. For instance, the payment processing service server(s) 104 can perform an electronic funds transfer from an account of the payment processing service to an account of the merchant (e.g., the merchant account).

Block 616 illustrates withholding a second portion of funds to repay at least a portion of the capital loan. In some examples, the payment processing service server(s) 104 can retain at least some funds associated with one or more of the transactions in an account of the payment processing service to repay at least a portion of the capital loan. For instance, the payment processing service server(s) 104 can retain at least a portion of the funds owed to the merchant instead of transferring the portion via an electronic funds transfer to an account of the merchant (e.g., the merchant account).

In alternative examples, the merchant can repay the capital loan in a more traditional manner, for instance, by submitting payments to the payment processing service at a particular frequency, etc. For instance, in such examples, the merchant can repay the capital loan via ACH debit by submitting payments to the payment processing service at a particular frequency, etc.

Figure 7:
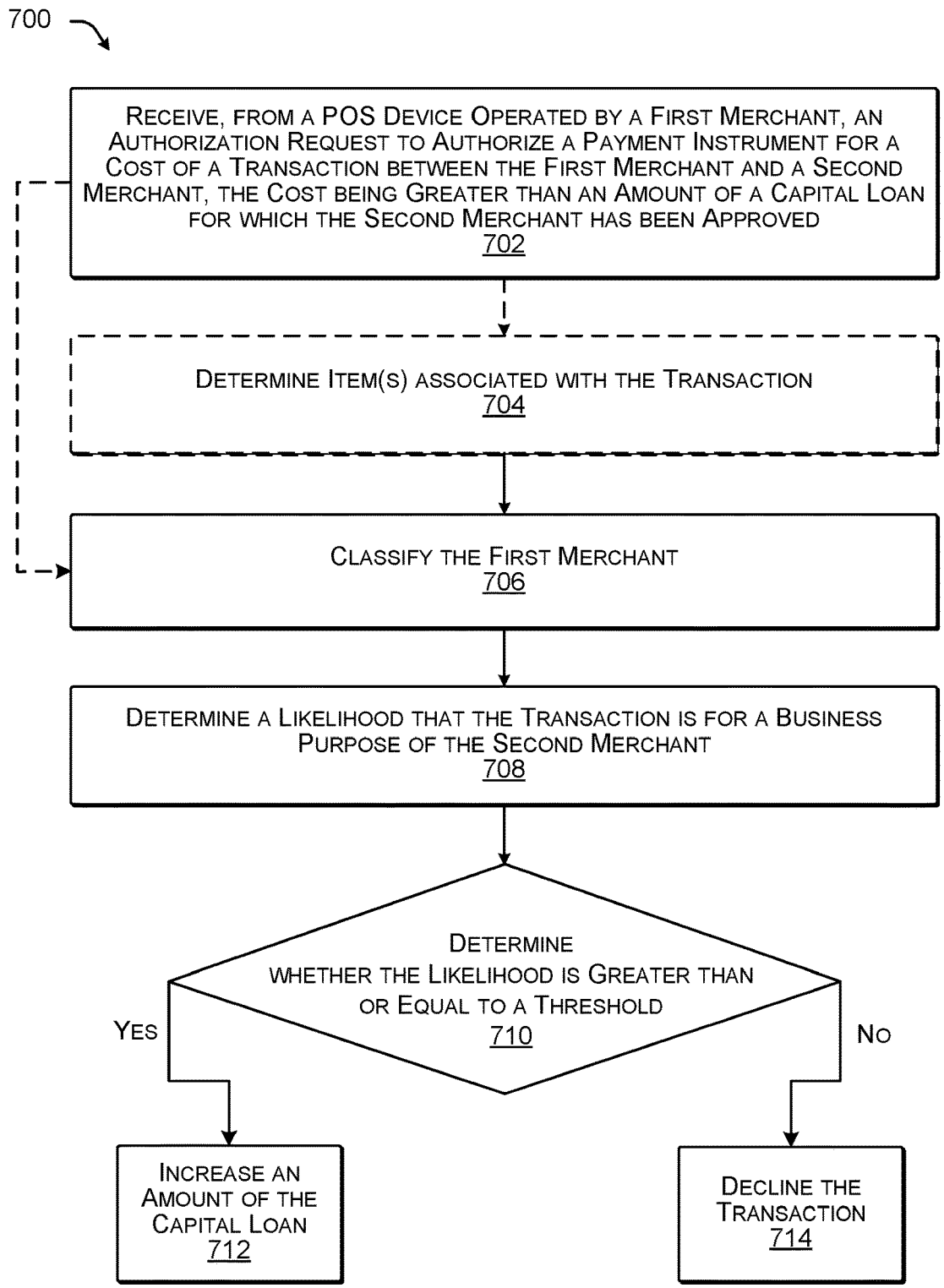
FIG. 7 depicts a non-limiting flow diagram illustrating a method for determining whether to modify an amount of a capital loan at a point-of-sale as described herein.

FIG. 7 depicts a non-limiting flow diagram illustrating a method 700 for determining whether to modify an amount of a capital loan at a point-of-sale.

Block 702 illustrates receiving, from a POS device operated by a first merchant, an authorization request to authorize a payment instrument for a cost of a transaction between the first merchant and a second merchant, the cost being greater than an amount of a capital loan for which the second merchant has been approved. As described above with reference to FIG. 5, a merchant device can include a merchant application that is installed on the merchant device to configure the merchant device as a POS terminal. That is, the merchant application can configure the merchant device to process one or more transactions and transmit transaction data associated with the one or more transactions to the payment processing service server(s) 104. In at least one example, the merchant device can send an authorization request (e.g., via the merchant application) to the payment processing service server(s) 104. The authorization request can request authorization of the payment instrument for a cost of a transaction. In at least one example, the authorization request can be associated with transaction data, which can include encrypted payment data (e.g., which can identify the payment instrument, etc.), user authentication data, purchase amount information, point-of-purchase information, etc. For instance, the point-of-purchase information can include an identity of the first merchant, an MCC, item(s) to be purchased, etc., as described above.

In at least one example, the payment processing service server(s) 104 can analyze the transaction data to determine that the payment instrument is associated with a capital loan product. As described above with reference to FIG. 6, based at least in part on determining that the payment instrument is associated with a capital loan product, the payment processing service server(s) 104 can access data associated with the payment instrument to determine a limit associated with the payment instrument. Based at least in part on determining that the limit of the payment instrument is less than the cost of the transaction, the payment processing service server(s) 104 can send a request to the capital loan management module 214 to increase the limit of the payment instrument.

Block 704 illustrates determining item(s) associated with the transaction. In at least one example, the capital loan management module 214 can analyze the authorization request (and associated transaction data) to determine item(s) associated with the transaction.

Block 706 illustrates classifying the first merchant. In at least one example, the capital loan management module 214 can analyze the authorization request (and associated transaction data) to classify the first merchant. In some examples, the authorization request (and associated transaction data) can identify the merchant and the capital loan management module 214 can access an existing merchant account associated with the first merchant. In such an example, the capital loan management module 214 can classify the first merchant based at least in part on data associated with the merchant account. Additionally or alternatively, the capital loan management module 214 can classify the first merchant based on the identity of the first merchant (e.g., semantic data mining, similarity analysis, etc.). In at least one example, the authorization request (and associated transaction data) can identify a MCC associated with the first merchant. In at least one example, the capital loan management module 214 can classify the first merchant based on the MCC.

In some examples, the authorization request (and associated transaction data) can include an identity of a merchant, an MCC, item(s) to be purchased, etc. In such an example, the capital loan management module 214 can perform operations as described in both block 704 and block 706 above. In other examples, the authorization request (and associated transaction data) may only include an identity of a merchant or an MCC. In such examples, the capital loan management module 214 can perform operations as described in block 706 and may not perform operations as described in block 704. That is, in some examples, block 704 is optional and/or may not be an option.

Block 708 illustrates determining a likelihood that the transaction is for a business purpose of the second merchant. In at least one example, the capital loan management module 214 can analyze the authorization request (and associated transaction data) in view of data stored in the inventory database 202, the appointments database 204, the transaction database 208, the merchant database 210, the other database(s) 212, etc. to determine whether the transaction is likely to be associated with a business purpose of the second merchant. For instance, the capital loan management module 214 can utilize a machine trained model to determine a likelihood that the transaction corresponding to the authorization request is associated with a business purpose of the second merchant. A machine trained model can be a model, trained by a machine learning mechanism (e.g., supervised, unsupervised, deep-learning, etc.) that analyzes training data and learns a likelihood that a transaction is likely to be associated with a business purpose of a merchant. In at least one example, the likelihood can be associated with a score, a number (e.g., 0-1), a percentage, etc.

Block 710 illustrates determining whether the likelihood is above the threshold. In at least one example, the capital loan management module 214 can compare the likelihood output by the machine trained model to a threshold. The threshold can be indicative of a likelihood that a transaction is associated with a business purpose of a merchant. Based at least in part on determining that the likelihood is greater than or equal to the threshold, the capital loan management module 214 can increase an amount of the capital loan, as illustrated in block 712. Based at least in part on determining that the likelihood is below the threshold, the capital loan management module 214 can decline the transaction, as illustrated in block 714.

FIG. 7 describes but one signal that can be used for determining whether to increase a capital loan. As described above with reference to FIGS. 3 and 6, various signals can be used in addition to, or as an alternative to, the likelihood that a transaction is related to a business purpose of the merchant. Furthermore, it should be noted that while the aforementioned disclosure is directed to increasing an amount of a capital loan at a POS, in additional or alternative examples, techniques described herein can be directed to decreasing an amount of a capital loan at a POS (e.g., based on signals indicating fraud, increased risk, failing business, etc.).

Figure 8:
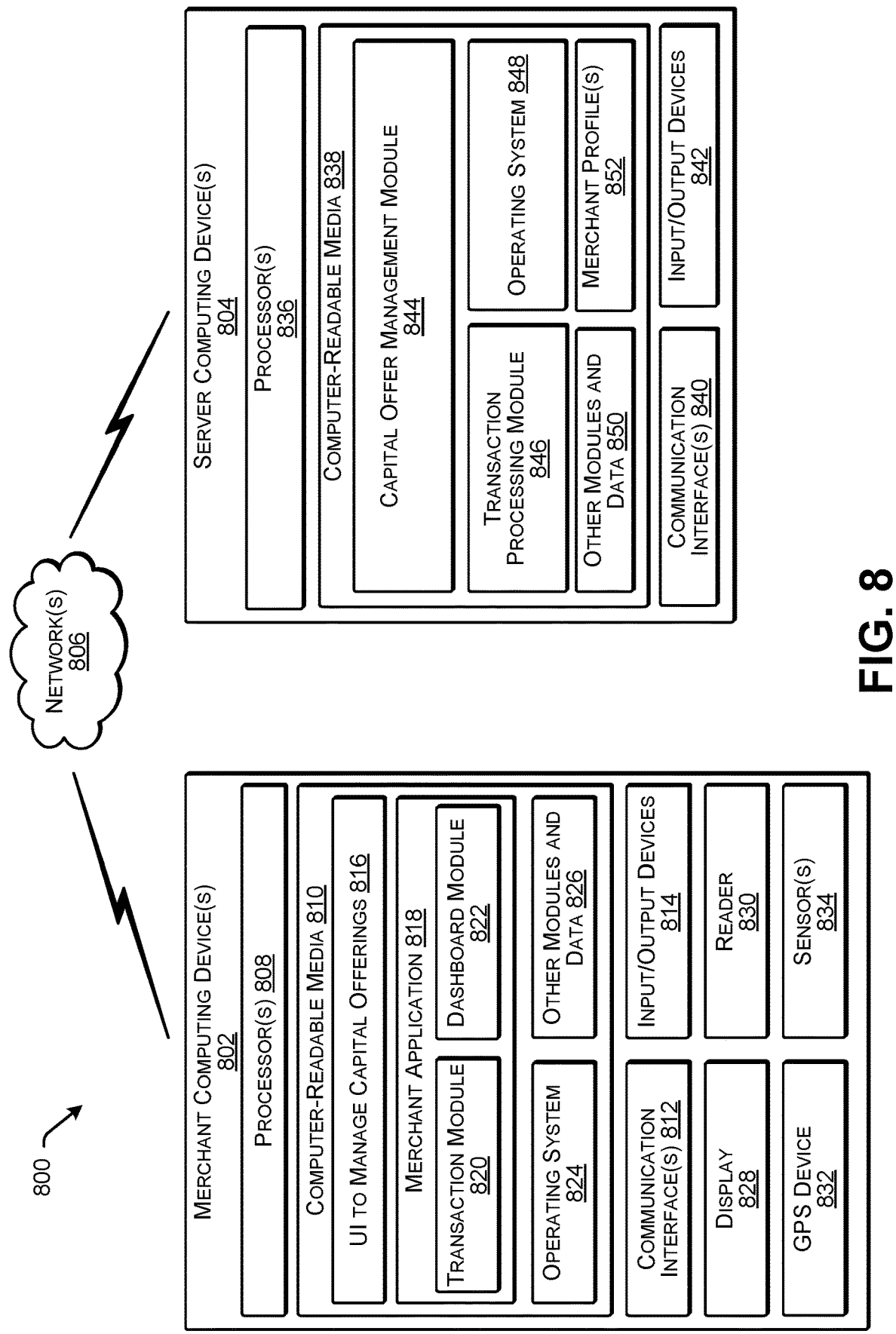
FIG. 8 depicts an illustrative block diagram illustrating a system for intelligently modifying capital loan offerings at a point-of-sale as described herein.

FIG. 8 depicts an illustrative block diagram illustrating a system 800 for intelligently modifying capital loan offerings at a point-of-sale. The system 800 includes merchant computing device(s) 802 (operated by merchant(s)) that communicate with server computing device(s) 804 (which can be associated with a service provider such as a payment processing service) via network(s) 806 (e.g., the Internet, cable network(s), cellular network(s), wireless network(s) (e.g., Wi-Fi) and wired network(s), as well as close-range communications such as Bluetooth®, Bluetooth® low energy, and the like). The Merchant A device 102A and the Merchant B device 102B are examples of merchant computing device(s) 802. Further, the payment processing service server(s) 104 are examples of server computing device(s) 804.

In at least one example, the merchant computing device(s) 802 can be any suitable type of computing device, e.g., portable, semi-portable, semi-stationary, or stationary. Some examples of the merchant computing device(s) 802 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant computing device(s) 802 include one or more processors 808, one or more computer-readable media 810, one or more communication interfaces 812, and one or more input/output (I/O) devices 814. Each processor 808 can itself comprise one or more processors or processing cores. For example, the processor(s) 808 can be implemented as one or more microprocessors, microcomputers, microcontrollers, digital signal processors, central processing units, state machines, logic circuitries, and/or any devices that manipulate signals based on operational instructions. In some examples, the processor(s) 808 can be one or more hardware processors and/or logic circuits of any suitable type specifically programmed or configured to execute the algorithms and processes described herein. The processor(s) 808 can be configured to fetch and execute computer-readable processor-executable instructions stored in the computer-readable media 810.

Depending on the configuration of the merchant computing device(s) 802, the computer-readable media 810 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 810 can include, but is not limited to, RAM, ROM, EEPROM, flash memory, solid-state storage, magnetic disk storage, optical storage, and/or other computer-readable media technology. Further, in some examples, the merchant computing device(s) 802 can access external storage, such as RAID storage systems, storage arrays, network attached storage, storage area networks, cloud storage, or any other medium that can be used to store information and that can be accessed by the processor(s) 808 directly or through another computing device or network. Accordingly, the computer-readable media 810 can be computer storage media able to store instructions, modules or components that can be executed by the processor(s) 808. Further, when mentioned, non-transitory computer-readable media exclude media such as energy, carrier signals, electromagnetic waves, and signals per se.

The computer-readable media 810 can be used to store and maintain any number of functional components that are executable by the processor(s) 808. In some implementations, these functional components comprise instructions or programs that are executable by the processor(s) 808 and that, when executed, implement operational logic for performing the actions and services attributed above to the merchant computing device(s) 802. Functional components stored in the computer-readable media 810 can include a user interface (UI) to manage capital offerings 816 and a merchant application 818, which can include a transaction module 820 and a dashboard module 822.

The UI to manage capital offerings 816 can, among other things, present user interface(s) that enable a merchant to access capital offers and manage a capital offering process (for a merchant operating a respective merchant computing device). In at least one example, the UI to manage capital offerings 816 can be presented via a web browser, or the like. In other examples, the UI to manage capital offerings can be presented via an application, such as a mobile application or desktop application, which is provided by the service provider, or which can be an otherwise dedicated application. In at least one example, the UI to manage capital offerings can detect an interaction between a merchant and a capital loan offer (e.g., actuation of a selectable control associated with the offer) and the UI to manage capital offerings can send an indication of such interaction to the server computing device(s) 804. As described above, in some examples, capital loan offerings can be sent to the merchant computing device(s) 802 via a text message, email, push notification, etc. In such examples, the capital offering process can be initiated via another application executable by the merchant computing device(s) 802 (e.g., a messaging application, an email application, etc.) and the UI to manage capital offerings 816 can facilitate capital loan origination and management (e.g., after the merchant responds to the offer).

The merchant application 818 can provide POS functionality to the merchant computing device(s) 802 to enable the merchant to accept payments from one or more customers at a POS location. For example, the merchant can use the merchant computing device(s) 802 to accept payments through various different types of payment instruments, e.g., payment cards, electronic payment, cash or check, cryptocurrency, etc. at the POS location from the one or more customers. In at least one example, the transaction module 820 can present various user interfaces to enable a merchant to conduct transactions, receive payments, and so forth. In at least one example, the transaction module 820 can send data associated with the payments (e.g., transaction data) to the server computing device(s) 804. Further, the dashboard module 822 can enable the merchant to manage transactions, payments, and so forth, via a dashboard. For the purpose of this discussion, a dashboard can be a user interface that provides an at-a-glance view of key information (e.g., associated with transactions, payments, etc.). As described above, in some examples, a capital loan offer can be presented via a dashboard, for instance, in association with a selectable control.

Furthermore, the computer-readable media 810 can include additional functional components, such as an operating system 884 for controlling and managing various functions of the merchant computing device(s) 802 and for enabling basic user interactions. In addition, the computer-readable media 810 can also store data, data structures and the like, that are used by the functional components. Depending on the type of the merchant computing device(s) 802, the computer-readable media 810 can also optionally include other functional components and data, such as other modules and data 826, which can include programs, drivers, etc., and the data used or generated by the functional components. For instance, in some examples, the merchant computing device(s) 802 can include a payroll module, an inventory management module, an employee management module, a financing module, an appointment module, etc., which can facilitate payroll services, inventory management services, employee management services, financing services, appointment services, etc., respectively. Such modules can provide data to respective databases as described above. Further, the merchant computing device(s) 802 can include many other logical, programmatic and physical components, of which those described are merely examples that are related to the discussion herein.

The communication interface(s) 814 can include one or more interfaces and hardware components for enabling communication with various other devices, such as over the network(s) 806 or directly. For example, communication interface(s) 814 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The merchant computing device(s) 802 can further include the one or more I/O devices 816. The I/O devices 816 can include speakers, a microphone, a camera, and various user controls (e.g., buttons, a joystick, a keyboard, a keypad, etc.), a haptic output device, and so forth.

In at least one example, merchant computing device(s) 802 can include a display 828. Depending on the type of computing device(s) used as the merchant computing device(s) 802, the display 828 can employ any suitable display technology. For example, the display 828 can be a liquid crystal display, a plasma display, a light emitting diode display, an OLED (organic light-emitting diode) display, an electronic paper display, or any other suitable type of display able to present digital content thereon. In some examples, the display 828 can have a touch sensor associated with the display 828 to provide a touchscreen display configured to receive touch inputs for enabling interaction with a graphic interface presented on the display 828. Accordingly, implementations herein are not limited to any particular display technology. Alternatively, in some examples, the merchant computing device(s) 802 may not include the display 828, and information can be presented by other means, such as aurally.

In addition, in some examples, the merchant computing device(s) 802 can include or can be connectable to a reader 830, for reading payment instruments. In some examples, the reader 830 can plug in to a port in the merchant computing device(s) 802, such as a microphone/headphone port, a data port, or other suitable port. The reader 830 can include a read head for reading a magnetic strip of a payment card, and further can include encryption technology for encrypting the information read from the magnetic strip. Additionally or alternatively, the reader 830 can be a Europay, MASTERCARD®, VISA® (EMV) payment reader. Moreover, numerous other types of readers can be employed with the merchant computing device(s) 802 herein, depending on the type and configuration of the merchant computing device(s) 802.

Other components included in the merchant computing device(s) 802 can include a GPS device 832 able to indicate location information. Further, the merchant computing device(s) 802 can include one or more sensors 834, such as an accelerometer, gyroscope, compass, proximity sensor, camera, microphone, and/or a switch, as discussed above. Additionally, the merchant computing device(s) 802 can include various other components that are not shown, examples of which include removable storage, a power source, such as a battery and power control unit, a barcode scanner, a printer, a cash drawer, and so forth.

The server computing device(s) 804 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server computing device(s) 804 as being present in a single location, these components and data can alternatively be distributed across different computing devices and different locations in any manner Consequently, the functions can be implemented by one or more server computing devices, with the various functionality described above distributed in various ways across the different computing devices. Multiple server computing device(s) 804 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server computing device(s) 804 can include one or more processors 836, one or more computer-readable media 838, one or more communication interfaces 840, and one or more input/output devices 842. Each processor 836 can be a single processing unit or a number of processing units, and can include single or multiple computing units or multiple processing cores. The processor(s) 836 can be implemented as one or more microprocessors, microcomputers, microcontrollers, digital signal processors, central processing units, state machines, logic circuitries, and/or any devices that manipulate signals based on operational instructions. For example, the processor(s) 836 can be one or more hardware processors and/or logic circuits of any suitable type specifically programmed or configured to execute the algorithms and processes described herein. The processor(s) 836 can be configured to fetch and execute computer-readable instructions stored in the computer-readable media 838, which can program the processor(s) 836 to perform the functions described herein.

The computer-readable media 838 can include volatile and nonvolatile memory and/or removable and non-removable media implemented in any type of technology for storage of information, such as computer-readable instructions, data structures, program modules, or other data. Such computer-readable media 838 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server computing device(s) 804, the computer-readable media 838 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 838 can be used to store any number of functional components that are executable by the processors 836. In many implementations, these functional components comprise instructions or programs that are executable by the processors 836 and that, when executed, specifically configure the one or more processors 836 to perform the actions attributed above to the service provider and/or payment processing service. Functional components stored in the computer-readable media 838 can include a capital offer management module 844 and a transaction processing module 846.

At least some of the functionality associated with the capital offer management module 844 is described above with reference to the capital offer management module 214 in FIGS. 2-7.

The transaction processing module 846 can receive transaction data associated with transactions from merchant computing device(s) 802. In at least one example, the transaction processing module 846 can receive an authorization request (e.g., via the merchant application) from a merchant computing device. The authorization request can request authorization of a payment instrument for a cost of a transaction. In at least one example, the authorization request can be associated with transaction data, which can include encrypted payment data (e.g., which can identify the payment instrument, etc.), user authentication data, purchase amount information, point-of-purchase information, etc. For instance, the point-of-purchase information can include an identity of a merchant, an MCC, item(s) to be purchased, etc., as described above.

In at least one example, the transaction processing module 846 can analyze the transaction data to determine whether the payment instrument is associated with a merchant bank account or a capital loan product. For instance, in at least one example, the encrypted payment data can identify the payment instrument, which may be linked to a merchant account or a capital loan product. Based at least in part on determining that the payment instrument is associated with a merchant bank account, the transaction processing module 846 can determine whether the merchant account has a balance greater than or equal to the cost of the transaction. That is, the transaction processing module 846 can access the merchant account and determine whether the merchant account has a balance greater than or equal to the cost of the transaction. Based at least in part on determining that the merchant account has a balance greater than or equal to the cost of the transaction, the transaction processing module 846 can authorize the transaction and withdraw the amount from the balance of the merchant account. Based at least in part on determining that the merchant account does not have a balance greater than or equal to the cost of the transaction, the transaction processing module 846 can decline the transaction and send an indication of the declination to the requesting computing device.

As described above, in at least one example, the transaction processing module 846 can analyze the transaction data to determine whether the payment instrument is associated with a merchant bank account or a capital loan product. Based at least in part on determining that the payment instrument is associated with a capital loan product, the transaction processing module 846 can access data associated with the payment instrument to determine a limit associated with the payment instrument. Based at least in part on determining that the limit of the payment instrument is greater than or equal to the cost of the transaction, the transaction processing module 846 can authorize the transaction. Based at least in part on determining that the limit of the payment instrument is less than the cost of the transaction, the transaction processing module 846 can send a request to the capital loan management module 844 to increase the limit of the payment instrument. Based at least in part on the capital loan management module 844 determining to increase the limit of the payment instrument (and the amount of the associated capital loan), the transaction processing module 846 can send an indication that the payment instrument is authorized for the second amount. Based at least in part on the capital loan management module 844 determining not to increase the limit of the payment instrument (and the amount of the associated capital loan), the transaction processing module 846 can decline the transaction.

Additional functional components stored in the computer-readable media 838 can include an operating system 848 for controlling and managing various functions of the server computing device(s) 804.

In at least one example, the computer-readable media 838 can include or maintain other functional components and data, such as other modules and data 850, which can include programs, drivers, etc., and the data used or generated by the functional components. At least some of the databases described above with reference to FIGS. 2 and 3 can be included and/or maintained in the other modules and data 850. Further, the server computing device(s) 804 can include many other logical, programmatic and physical components, of which those described above are merely examples that are related to the discussion herein.

In addition, the computer-readable media 838 can store data used for performing the operations described herein. Thus, the computer-readable media 838 can store merchant profile(s) 852. In at least one example, the merchant profile(s) 852 can correspond to the merchant database 210 described above with reference to FIGS. 2 and 3. In at least one example, the merchant profile(s) 852 can store information associated with individual merchant(s). For instance, a merchant profile of the merchant profile(s) 852 can store merchant data including, but not limited to, an identifier of the merchant, a MCC, item(s) offered for sale by the merchant, transaction data associated with transactions conducted by the merchant (e.g., via the merchant application 818), hardware (e.g., device type) used by the merchant, previous loans made to the merchant, previous defaults on said loans, an indication of risk (e.g., based at least in part on fraud, chargeback, etc.) associated with the merchant, etc. In at least one example, a merchant profile can store data derived from the transaction data. For instance, a merchant profile can store merchant data indicating a volume of transactions processed by the payment processing service on behalf of the merchant, a frequency of transactions processed by the payment processing service on behalf of the merchant, etc.

The communication interface(s) 840 can include one or more interfaces and hardware components for enabling communication with various other devices, such as over the network(s) 806. For example, communication interface(s) 840 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The server computing device(s) 804 can further be equipped with various input/output (I/O) devices 842. Such I/O devices 842 can include a display, various user interface controls (e.g., buttons, joystick, keyboard, mouse, touch screen, etc.), audio speakers, connection ports and so forth.

It should be noted that while the disclosure above is directed to capital loan products, in additional or alternative examples, the techniques described herein can be applicable to any type of financing products.

Furthermore, the foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed:

1. A system comprising:
   at least one computing device associated with a payment service, the at least one computing device configured by executable instructions to perform operations comprising:

receiving, by the at least one computing device and from a point of sale (POS) device associated with a merchant, an authorization request to authorize a payment instrument, associated with the payment service, for a first transaction taking place for purchase of one or more items by a user from the merchant, wherein the payment instrument is usable for transactions with different merchants and comprises at least one of a virtual card or a physical card;

sending, by the at least one computing device and to the POS device, an authorization approval to the authorization request;

determining, by the at least one computing device, that the user is eligible for a loan for a predefined amount associated with the transaction, wherein the predefined amount is determined based at least in part on a cost of the one or more items, and the loan is to be repaid at a particular frequency during a period of time;
determining, by the at least one computing device, that an amount of the first transaction is less than or equal to the predefined amount;
causing, by the at least one computing device, an offer for the loan for the predefined amount associated with the transaction to be presented via a user interface of a payment application associated with the payment service, wherein the payment application is executable by a user device of the user; and
based in part on receiving an input via the user interface accepting the offer for the loan, and based in part on the merchant charging the payment instrument to receive payment for the first transaction, applying, by the at least one computing device, funds associated with the loan to the first transaction as financing for at least partial payment for the purchase of the one or more items, wherein after the funds have been applied as the financing for the at least partial payment for the purchase of the one or more items, the loan is to be repaid at the particular frequency during the period of time.

2. The system as recited in claim 1, wherein the funds associated with the loan are accessible based on the payment instrument.

3. The system as recited in claim 1, the operations further comprising associating the loan with the payment instrument in advance of initiation of the first transaction at the POS device.

4. The system as recited in claim 1, the operations further comprising determining the predefined amount further based in part on transaction information related to at least one of:
past transactions associated with the user; or
past transactions associated with other users determined, based at least on one or more characteristics, to be similar to the user.

5. The system as recited in claim 1, the operations further comprising:
receiving transaction information related to a second transaction associated with the user;
transferring a first portion of funds from the second transaction to the account associated with the user; and
withholding a second portion of the funds for repayment of at least a portion of the loan.

6. The system as recited in claim 1, the operations further comprising receiving, from another account associated with the user, a transfer of funds for repayment for at least a portion of the loan.

7. The system as recited in claim 1, wherein the operation of causing the offer for the loan to be presented via the user interface of the payment application executable on the user device further comprises causing the offer to be presented via the user interface for the purchase of the one or more items.

8. A method implemented by at least one computing device of a payment service, the method comprising:
receiving, by the at least one computing device and from a point of sale (POS) device associated with a merchant, an authorization request to authorize a payment instrument, associated with the payment service, for a first transaction taking place for purchase of one or more items by a user from the merchant, wherein the payment instrument is usable for transactions with different merchants and comprises at least one of a virtual card or a physical card;
sending, by the at least one computing device and to the POS device, an authorization approval to the authorization request;
determining, by the at least one computing device, that the user is eligible for a loan for a predefined amount associated with the transaction, wherein the predefined amount is determined based at least in part on a cost of the one or more items, and the loan is to be repaid at a particular frequency during a period of time;
determining, by the at least one computing device, that an amount of the first transaction is less than or equal to the predefined amount;
causing, by the at least one computing device, an offer for the loan for the predefined amount associated with the transaction to be presented via a user interface of a payment application associated with the payment service, wherein the payment application is executable by a user device of the user; and
based in part on receiving an input via the user interface accepting the offer for the loan, and based in part on the merchant charging the payment instrument to receive payment for the first transaction, applying, by the at least one computing device, funds associated with the loan to the first transaction as financing for at least partial payment for the purchase of the one or more items, wherein after the funds have been applied as the financing for the at least partial payment for the purchase of the one or more items, the loan is to be repaid at the particular frequency during the period of time.

9. The method as recited in claim 8, wherein the funds associated with the loan are accessible based on the payment instrument.

10. The method as recited in claim 8, further comprising associating the loan with the payment instrument in advance of initiation of the first transaction at the POS device.

11. The method as recited in claim 8, further comprising determining the predefined amount based in part on transaction information related to at least one of:
past transactions associated with the user; or
past transactions associated with other users determined, based at least on one or more characteristics, to be similar to the user.

12. The method as recited in claim 8, further comprising:
receiving transaction information related to a second transaction associated with the user;
transferring a first portion of funds from the second transaction to the account associated with the user; and
withholding a second portion of the funds for repayment of at least a portion of the loan.

13. The method as recited in claim 8, further comprising receiving, from another account associated with the user, a transfer of funds for repayment for at least a portion of the loan.

14. The method as recited in claim 8, wherein causing the offer for the loan to be presented via the user interface of the payment application executable on the user device further comprises causing the offer to be presented via the user interface for the purchase of the one or more items.

15. One or more non-transitory computer readable media storing instructions executable by at least one computing device of a payment service to configure the at least one computing device to perform operations comprising:
receiving, by the at least one computing device and from a point of sale (POS) device associated with a merchant, an authorization request to authorize a payment instrument, associated with the payment service, for a first transaction taking place for purchase of one or more items by a user from the merchant, wherein the payment instrument is usable for transactions with different merchants and comprises at least one of a virtual card or a physical card;

sending, by the at least one computing device and to the POS device, an authorization approval to the authorization request;

determining, by the at least one computing device, that the user is eligible for a loan for an amount associated with the transaction, wherein the amount is determined based at least in part on a cost of the one or more items and the loan is to be repaid at a particular frequency during a period of time;

determining, by the at least one computing device, that a transaction amount of the first transaction is less than or equal to the amount;

causing, by the at least one computing device, an offer for the loan for the amount associated with the transaction to be presented via a user interface of a payment application associated with the payment service, wherein the payment application is executable by a user device of the user; and based in part on receiving an input via the user interface accepting the offer for the loan, and based in part on the merchant charging the payment instrument to receive payment for the first transaction, applying, by the at least one computing device, funds associated with the loan to the first transaction as financing for at least partial payment for the purchase of the one or more items, wherein after the funds have been applied as the financing for the at least partial payment for the purchase of the one or more items, the loan is to be repaid at the particular frequency during the period of time.

16. The one or more non-transitory computer readable media as recited in claim 15, wherein the funds associated with the loan are accessible based on the payment instrument.

17. The one or more non-transitory computer readable media as recited in claim 15, the operations further comprising associating the loan with the payment instrument in advance of initiation of the first transaction at the POS device.

18. The one or more non-transitory computer readable media as recited in claim 15, the operations further comprising determining the amount further based in part on transaction information related to at least one of:
past transactions associated with the user; or
past transactions associated with other users determined, based at least on one or more characteristics, to be similar to the user.

19. The one or more non-transitory computer readable media as recited in claim 15, the operations further comprising:
receiving transaction information related to a second transaction associated with the user;
transferring a first portion of funds from the second transaction to the account associated with the user; and
withholding a second portion of the funds for repayment of at least a portion of the loan.

20. The one or more non-transitory computer readable media as recited in claim 15, the operations further comprising receiving, from another account associated with the user, a transfer of funds for repayment for at least a portion of the loan.

* * * * *